(12) United States Patent
Ikeda et al.

(10) Patent No.: US 9,013,579 B2
(45) Date of Patent: Apr. 21, 2015

(54) VEHICLE SURROUNDING-AREA MONITORING APPARATUS

(75) Inventors: Keigo Ikeda, Anjo (JP); Hiroyuki Watanabe, Chiryu (JP); Takashi Kato, Anjo (JP); Masaki Katagiri, Gifu (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/124,445

(22) PCT Filed: May 18, 2012

(86) PCT No.: PCT/JP2012/062846
§ 371 (c)(1),
(2), (4) Date: Dec. 6, 2013

(87) PCT Pub. No.: WO2012/172933
PCT Pub. Date: Dec. 20, 2012

(65) Prior Publication Data
US 2014/0118551 A1      May 1, 2014

(30) Foreign Application Priority Data

Jun. 16, 2011   (JP) .................................. 2011-134463
Jun. 16, 2011   (JP) .................................. 2011-134464

(51) Int. Cl.
*G06K 9/00*   (2006.01)
*B60R 1/00*   (2006.01)
(Continued)

(52) U.S. Cl.
CPC .............. *G06K 9/00805* (2013.01); *B60R 1/00* (2013.01); *G08G 1/166* (2013.01); *G08G 1/168* (2013.01); *B60R 2300/307* (2013.01); *G06T 3/0018* (2013.01)

(58) Field of Classification Search
CPC . G06K 9/00805; G06K 9/00771; G06K 9/00; B60R 1/00; B60R 2300/105; B60R 11/04; B60R 2300/802; H04N 7/181; H04N 7/18; G08B 13/196
USPC ........................................................ 348/148
See application file for complete search history.

(56) References Cited

U.S. PATENT DOCUMENTS 5,339,152 A * 8/1994 Horn ............................ 356/458
5,670,935 A * 9/1997 Schofield et al. ............. 340/435
(Continued)

FOREIGN PATENT DOCUMENTS

CN      1787636 A      6/2006
CN      1878299 A      12/2006
(Continued)

OTHER PUBLICATIONS

Chen et al, An Embedded System for Vehicle Surrounding Monitoring, 2009.*

(Continued)

*Primary Examiner* — Shan Elahi
(74) *Attorney, Agent, or Firm* — Sughrue Mion, PLLC

(57) ABSTRACT

A vehicle surrounding-area monitoring apparatus that, when recognizing an obstacle, allows for easy determination of the positional relationship between the obstacle and scenery included in a video image of the area surrounding the vehicle, generates a narrow view-field region that is a part of the video image as a notable video image, and if an obstacle region that is a region of the recognized obstacle in the video image is located outside of the narrow view-field region and if the obstacle region is contained in an image region that is partially overlapping with the narrow view-field region and is a part of the video image, generates the image region as a notable obstacle image so as to generate a surrounding-area monitoring display image comprised of the notable video image and the notable obstacle image.

13 Claims, 12 Drawing Sheets

(51) Int. Cl.
*G08G 1/16* (2006.01)
*G06T 3/00* (2006.01)

(56) References Cited

U.S. PATENT DOCUMENTS

| | | | |
|---|---|---|---|
| 5,689,287 A | 11/1997 | Mackinlay et al. | |
| 6,222,447 B1* | 4/2001 | Schofield et al. | 340/461 |
| 7,366,595 B1* | 4/2008 | Shimizu et al. | 701/301 |
| 7,640,107 B2* | 12/2009 | Shimizu et al. | 701/523 |
| 7,640,108 B2* | 12/2009 | Shimizu et al. | 701/301 |
| 7,804,426 B2* | 9/2010 | Etcheson | 340/937 |
| 8,058,980 B2 | 11/2011 | Yanagi et al. | |
| 8,289,189 B2* | 10/2012 | Becker et al. | 340/932.2 |
| 2004/0109009 A1* | 6/2004 | Yonezawa et al. | 345/632 |
| 2004/0223058 A1* | 11/2004 | Richter et al. | 348/207.1 |
| 2005/0232469 A1* | 10/2005 | Schofield et al. | 382/104 |
| 2006/0108509 A1* | 5/2006 | Frangioni et al. | 250/208.1 |
| 2006/0132601 A1 | 6/2006 | Kukita et al. | |
| 2006/0184297 A1* | 8/2006 | Higgins-Luthman | 701/41 |
| 2006/0192660 A1* | 8/2006 | Watanabe et al. | 340/435 |
| 2006/0230332 A1* | 10/2006 | Lin | 715/500.1 |
| 2006/0274147 A1 | 12/2006 | Chinomi et al. | |
| 2007/0120657 A1* | 5/2007 | Schofield et al. | 340/435 |
| 2007/0257781 A1* | 11/2007 | Denson | 340/425.5 |
| 2007/0257804 A1* | 11/2007 | Gunderson et al. | 340/576 |
| 2007/0257815 A1* | 11/2007 | Gunderson et al. | 340/903 |
| 2007/0268158 A1* | 11/2007 | Gunderson et al. | 340/933 |
| 2007/0271105 A1* | 11/2007 | Gunderson et al. | 705/1 |
| 2008/0055407 A1* | 3/2008 | Abe | 348/118 |
| 2008/0129539 A1* | 6/2008 | Kumon | 340/901 |
| 2008/0181488 A1* | 7/2008 | Ishii et al. | 382/154 |
| 2009/0040306 A1* | 2/2009 | Foote et al. | 348/148 |
| 2009/0187300 A1* | 7/2009 | Everitt et al. | 701/29 |
| 2009/0207045 A1* | 8/2009 | Jung | 340/932.2 |
| 2010/0049402 A1* | 2/2010 | Tanaka | 701/41 |
| 2010/0066825 A1* | 3/2010 | Kuboyama et al. | 348/118 |
| 2010/0097199 A1* | 4/2010 | Schwartz et al. | 340/435 |
| 2010/0134264 A1* | 6/2010 | Nagamine et al. | 340/435 |
| 2010/0134626 A1* | 6/2010 | Icho et al. | 348/158 |
| 2010/0194886 A1* | 8/2010 | Asari et al. | 348/148 |
| 2010/0217488 A1* | 8/2010 | Nijakowski et al. | 701/48 |
| 2010/0246901 A1* | 9/2010 | Yang | 382/107 |
| 2011/0095910 A1* | 4/2011 | Takano | 340/932.2 |
| 2011/0106380 A1* | 5/2011 | Wang et al. | 701/36 |
| 2011/0157226 A1* | 6/2011 | Ptucha et al. | 345/638 |
| 2012/0033080 A1* | 2/2012 | Watanabe et al. | 348/148 |
| 2014/0333729 A1* | 11/2014 | Pflug | 348/47 |

FOREIGN PATENT DOCUMENTS

| | | | | |
|---|---|---|---|---|
| CN | 101396989 A | 4/2009 | | |
| CN | 101489117 A | 7/2009 | | |
| CN | 201604583 U | 10/2010 | | |
| EP | 0 651 350 A1 | 5/1995 | | |
| EP | 1170172 A2 * | 1/2002 | | B60Q 1/48 |
| JP | 2003-143596 A | 5/2003 | | |
| JP | 2009-217740 A | 9/2009 | | |
| JP | 2010-130646 A | 6/2010 | | |
| JP | 2010-130647 A | 6/2010 | | |

OTHER PUBLICATIONS

International Preliminary Report on Patentability for PCT/JP2012/062846 dated Jan. 3, 2014.
Extended European Search Report, dated Mar. 24, 2014, issued in counterpart European Patent Application No. 12800602.0.
Liu F et al: "Automatic image retargeting with fisheye-view warping", UIST 05. Proceedings of the 18th. Annual ACM Symposium on User Interface Software and Technology, Oct. 23, 2005, pp. 153-162.
Tarak Gandhi et al: "Vehicle Surround Capture: Survey of Techniques and a Novel Omni-Video-Based Approach for Dynamic Panoramic Surround Maps", IEEE Transactions on Intelligent Transportation Systems, IEEE, Piscataway, NJ, USA, vol. 7, No. 3, Sep. 1, 2006, pp. 293-308.
Leung Y K et al: "A review and taxonomy of distortion-oriented presentation techniques", ACM Transactions on Computer-Human Interaction (TOCHI), ACM, New York, NY, USA, vol. 1, No. 2, Jun. 1, 1994, pp. 126-160.
Chinese Office Action, dated Jul. 30, 2014, issued in corresponding Chinese Patent Application No. 201280029641.9.
International Search Report of PCT/JP2012/062846 dated Aug. 7, 2012.
Written Opinion of PCT/JP2012/062846 dated Aug. 7, 2012.

* cited by examiner

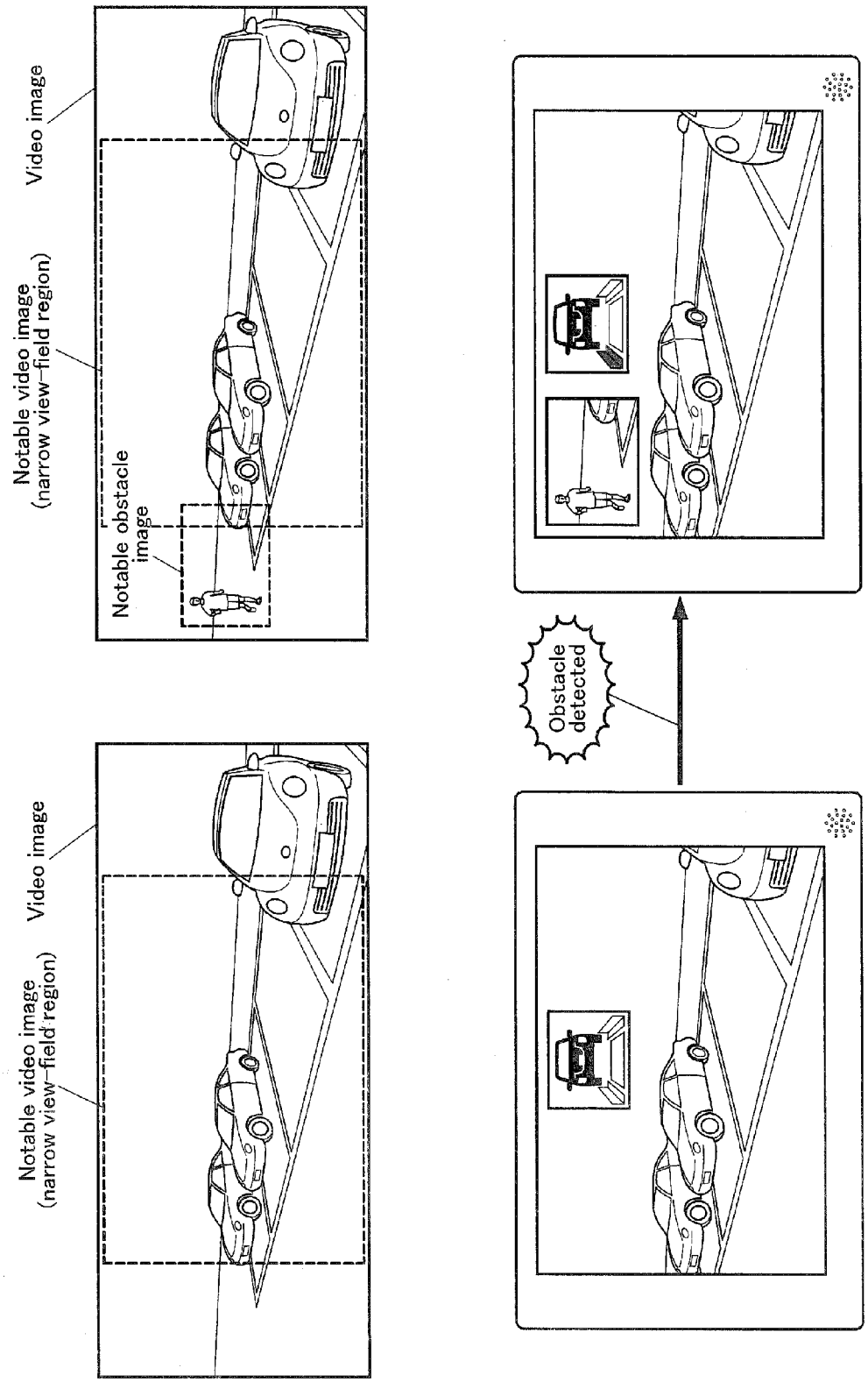

VEHICLE SURROUNDING-AREA MONITORING APPARATUS

CROSS REFERENCE TO RELATED APPLICATIONS

This application is a National Stage of International Application No. PCT/JP2012/062846, filed on May 18, 2012, claiming priority based on Japanese Patent Application No. 2011-134463, filed on Jun. 16, 2011, and Japanese Patent Application No. 2011-134464, filed on Jun. 16, 2011, the contents of all of which are incorporated herein by reference in their entirety.

TECHNICAL FIELD

The present invention relates to an apparatus for recognizing obstacles by using video images of the area surrounding a vehicle obtained by an imaging unit.

BACKGROUND ART

A vehicle monitoring apparatus is known, including a camera that is mounted on a vehicle and includes a wide-angle lens for capturing an area surrounding the vehicle in a wide field of view; an image extraction means for extracting an image from a predetermined region of the image captured by the camera via the wide-angle lens; a display means for displaying the image extracted by the image extraction means; and an obstacle detecting means for detecting an obstacle in the area surrounding the vehicle. The vehicle monitoring apparatus extracts from the video image an image corresponding to the direction in which the obstacle detected by the obstacle detecting means is located and displays an enlarged view of that image on a display unit (see, for example, Patent Document 1). In further detail, under normal conditions, an entire image captured by the camera, an image extracted from the lower center of the video image, an image extracted from the lower right of the video image, and an image extracted from the lower left of the video image are displayed repeatedly and sequentially for a predetermined period of time. If an obstacle is detected by the right rear sonar, from the video image stored in the image memory, a predetermined left-side region of the image is extracted and displayed as an enlarged view in full screen mode (as the camera is pointed rearward from the vehicle, the obstacle, located rear right of the vehicle is on the left side of the video image). If an obstacle is detected by the left rear sonar, a predetermined right-side region of the image is extracted from the video image and displayed as an enlarged view in full screen mode. It is also proposed to provide a small auxiliary screen in a predetermined position on the display screen (for example, in the upper right on the screen) to display the position of the vehicle and the image capture area corresponding to the extracted image. According to this vehicle monitoring apparatus, however, since the part of the monitor display video image that shows a detected obstacle is extracted and displayed in an enlarged view, no image of the obstacle can be displayed if the obstacle is not in the video image displayed on the monitor. If the image capture field of view is widened to avoid this problem, the image region in the center of the field of view which serves an important purpose under normal conditions, becomes relatively small with respect to the display area of the monitor, making it difficult to confirm the condition of the surrounding area through the image displayed on the monitor.

A vehicle surrounding-area monitoring apparatus is known from Patent Document 2 that generates, based on obstacle distance and obstacle condition information regarding a detected obstacle, a single obstacle display image showing both obstacle distance and obstacle condition information and generates image signals for showing a video sequence of the generated obstacle images. In this apparatus, when an obstacle(s) approaches the vehicle from one or both sides of the vehicle, the monitor screen displays an image generated by using mapping to enlarge the surrounding areas that correspond to both sides of the vehicle as well as an obstacle display image in which a vehicle icon and an obstacle icon are arranged. Here, the obstacle icon is configured to indicate the obstacle distance, the direction of approach, the speed of approach, and the time of arrival of the obstacle by its position in relation to the vehicle icon, shape, size, and color. With the help of the video image enlarging both sides of the vehicle and the obstacle display image, obstacles approaching from either side of the vehicle can be recognized more easily. However, the displayed video image is acutely distorted in order to enlarge the surrounding areas corresponding to both sides of the vehicle, resulting in a distorted center region and a generally difficult image to view. Furthermore, since the video image itself is a wide view-field image, even the acute partial enlargement still produces outer obstacle images of limited size. Furthermore, the use of icons in the periphery (in the lower portion) of video images to indicate the locations and approaching of obstacles necessitates combination of completely different types of image information, i.e., the video images of actual scenery and abstract images, such as icons, which is not conducive to intuitive recognition of obstacles.

The vehicle surrounding-area monitoring apparatus described in Patent Document 3 generates a narrow view-field image showing part of the area surrounding the vehicle from the image of the area surrounding the vehicle obtained by an imaging unit and, if the obstacle recognized in the area surrounding the vehicle is not contained in the narrow view-field image, the region of the image containing the obstacle is cut out from the video image as an obstacle image and output to the monitor with the narrow view-field image. The narrow view-field image and the obstacle image, displayed if an obstacle is recognized around the vehicle, have a uniform image quality since they are both cut out from the same video image. However, no continuity exists between the narrow view-field image and the obstacle image as they are independently cut out from the video image, thus making it difficult to recognize the positional relationship therebetween.

PRIOR ART DOCUMENTS

Patent Documents

Patent Document 1: JP 2003-143596A (Paragraphs [0005]-[0026] and FIGS. 4-5).
Patent Document 2: JP 2009-217740A (Paragraphs [0022]-[0066] and FIG. 4).
Patent Document 3: JP 2010-130646A (Paragraphs [0020]-[0026] and FIGS. 4-5).

DISCLOSURE OF THE INVENTION

Problem to be Solved by the Invention

In light of the above, there is a need for a vehicle surrounding-area monitoring apparatus that, upon recognizing an obstacle, provides for easy recognition of the positional relationship between the scenery included in a video image of the area surrounding the vehicle and the obstacle.

Means for Solving Problem

In order to solve the above-identified problem, a vehicle surrounding-area monitoring apparatus according to the present invention includes: a notable video image generation unit generating a narrow view-field region as a notable video image, the narrow view-field region being part of a video image of an area surrounding a vehicle obtained by an imaging unit; an obstacle recognition unit recognizing an obstacle in the area surrounding the vehicle; an obstacle region calculation unit calculating an obstacle region, the obstacle region being a region, in the video image, of the obstacle recognized by the obstacle recognition unit; a notable obstacle image generation unit generating the video region as a notable obstacle image if the obstacle region is contained in an image region that is partially overlapping with the narrow view-field region and is a part of the video image; and an image merge unit generating a surrounding-area monitoring display image including the notable video image and the notable obstacle image.

According to this configuration, under normal conditions, a narrow view-field image, which is a region of particular importance for vehicle traveling, may be generated as a notable video image from a video image that is a wide view-field image obtained by the imaging unit and displayed on a monitor. This allows the driver to confirm it is safe to travel in the narrow view-field region. Moreover, even if the obstacle region is outside of the narrow view-field region, the notable obstacle image generation unit generates a notable obstacle image that partially overlaps with the narrow view-field image, thus allowing for confirmation, via the monitor, of the obstacle outside of the narrow view-field region through the notable obstacle image, which contains an image of the narrow view-field region. Accordingly, the positional relationship between the scenery included in the video image of the area surrounding the vehicle and the obstacle can be easily grasped through the surrounding-area monitoring display image.

In an example of a specific embodiment of the generation of a notable obstacle image by the notable obstacle image generation unit, a wide view-field obstacle image is generated as the notable obstacle image, the wide view-field obstacle image including an obstacle region that is an image region of the obstacle video image, a transition region connecting the obstacle region to the narrow view-field region, and an overlapping region extending into the narrow view-field region from the transition region. In this embodiment, a notable obstacle image, generated when an obstacle is recognized in the wide view-field region outside the narrow view-field region, contains part of the notable video image as the overlapping region. Accordingly, when the notable video image and the notable obstacle image are displayed on the monitor, the overlapping region allows the driver to grasp the connection between the notable video image and the notable obstacle image more easily. Although it is necessary to provide a transition region in principle if the continuity from the overlapping region to the obstacle region is to be maintained, an adequate continuity can be obtained between the notable obstacle image and the notable video image if at least the overlapping region and the obstacle region are maintained. Accordingly, the positional relationship between the scenery included in the video image of the area surrounding the vehicle and the obstacle can be easily grasped through the surrounding-area monitoring display image.

In a preferred embodiment of the present invention, when no obstacle is recognized, the notable video image is displayed as the surrounding-area monitoring display image, and when an obstacle is recognized, the notable obstacle image is displayed as a pop-up on the surrounding-area monitoring display image. In this configuration, under normal conditions, when no obstacle is recognized, only a notable video image can be displayed on the monitor, providing excellent monitoring of the surrounding area through the surrounding-area monitoring display image under normal conditions.

The regions that cannot be displayed on the notable video image are substantially located to the right and left and outside of the narrow view-field region, on which the notable video image is based. Accordingly, it is preferable to display notable obstacle image(s) on the monitor on the left side or the right side, or both of these sides of the notable video image. In order to achieve this purpose, in a preferred embodiment of the present invention, a right and left pair of placement regions for placing the notable obstacle images are set in the surrounding-area monitoring display image so as to be symmetrical with respect to the notable video image such that the notable obstacle images are generated for placement in the placement regions.

In the above, if an indicator, indicating the direction in which the obstacle is located with respect to the vehicle, is placed in an upper middle portion of the notable video image, it advantageously clarifies the positional relationship between the notable obstacle image and the vehicle.

The configuration may be such that the notable obstacle image generation unit generates a notable obstacle image containing at least the obstacle region from the video image if the obstacle region is located outside of the narrow view-field image. The image merge unit merges the notable video image, the notable obstacle image, and an indicator image that indicates the relative position of the notable obstacle image with respect to the vehicle so as to display the notable obstacle image as a pop-up on a monitor screen.

According to this configuration, under normal conditions, a narrow view-field region, which is a region of particular importance for vehicle traveling, may be generated as a notable video image from a video image that is a wide view-field image obtained by the imaging unit and displayed on a monitor. This allows the driver to confirm it is safe to travel in the narrow view-field region. Furthermore, if an obstacle is recognized outside of the narrow view-field region, an obstacle region, which is a video region in the video image of the obstacle, is calculated and a notable obstacle image containing the obstacle region is displayed as a pop-up on the monitor screen where the notable video image is displayed. Also displayed at this moment as a pop-up on the same monitor screen is an indicator image representing an indicator that indicates the relative position of the obstacle shown in the notable obstacle image displayed as a pop-up with respect to the vehicle. Accordingly, the driver can recognize not only the recognized obstacle through the pop-up display of the notable obstacle image showing the obstacle but also the relative position of the obstacle with respect to the vehicle through the indicator image likewise displayed as a pop-up.

In a preferred embodiment of the present invention, the indicator image is displayed in an upper middle portion of the notable video image with the notable obstacle image displayed to one side of the indicator image. In this configuration, when an obstacle is recognized outside of the notable video image, the notable obstacle image and the indicator image are displayed as pop-ups in upper regions of the notable video image, which generally show the sky, the roofs of structures, and other objects that are considered relatively unimportant for vehicle traveling. As such, it is unnecessary to set aside spaces on the monitor screen for the notable obstacle image and the indicator image. As an obstacle occurs essentially outside of the image region of the notable video image to the right or the left of the image region, it can be displayed as a pop-up to the right or left of the indicator image depending on the relative position of the obstacle with respect to the vehicle. This further facilitates the driver's recognition of the relative position of the obstacle with respect to the vehicle.

One important use of monitoring the area surrounding the vehicle is to check the surrounding area behind the vehicle with the monitor to complement the checking with the rear-view mirror. According to a preferred embodiment of the present invention, therefore, the area surrounding the vehicle is the area rearward of the vehicle and the notable video image is laterally inverted from an image captured by the imaging unit. In other words, the notable video image may be described as being part of a lateral inversion of an image captured by the imaging unit. In the vehicle surrounding-area monitoring apparatus thus constructed, the monitor displaying video images fills the role of the rear-view mirror without creating a sense of discomfort, thus achieving effective rear area monitoring.

According to a preferred embodiment of the present invention, the notable obstacle image and the indicator image are displayed as pop-ups within the notable video image. In this configuration, only when an obstacle is recognized outside of the notable video image, the notable obstacle image and the indicator image are displayed as pop-ups in the notable video image, i.e., superimposed as pop-ups on the notable video image. Accordingly, the driver, when observing the notable video image while driving, will clearly see that an obstacle is recognized outside of the notable video image region.

In a preferred embodiment of the present invention, the notable obstacle image is comprised of an image in the obstacle region, an image in a transition region transitioning from the obstacle region to the narrow view-field region, and an image in an overlapping region extending into the narrow view-field region from the transition region. In this configuration, since part of the notable video image is contained in the notable obstacle image as the overlapping region, when the notable obstacle image is displayed as a pop-up on the notable video image, which is currently displayed on the monitor, advantageously, the driver can easily grasp the connection between the notable video image and the notable obstacle image through the overlapping region.

If an obstacle is too far from the vehicle or too large, the notable obstacle image becomes too large to be properly accommodated in the surrounding-area monitoring display image, which in turn necessitates size reduction of the notable obstacle image. Therefore, in a preferred embodiment of the present invention, the transition region is compressed along the direction of the transition according to the distance between the obstacle region and the narrow view-field region, or the notable obstacle image is enlarged or reduced according to the distance between the obstacle region and the narrow view-field region.

If an obstacle is too far from the vehicle or too large or small, the notable obstacle image becomes too large or too small to be properly accommodated in the surrounding-area monitoring display image. This, however, may be resolved by enlargement or reduction of the notable obstacle image. In this regard, if the obstacle is far away from the vehicle, thus rendering the notable obstacle image long and narrow, it is preferable to compress the transition region in the direction along the transition according to the distance between the obstacle and the vehicle. It is necessary to provide a transition region in principle to maintain the continuity from the overlapping region to the obstacle region. However, if at least the overlapping region and the obstacle region are maintained, for practical purposes, continuity can be sufficiently obtained between the notable obstacle image and the notable video image. It should be noted that the compression of the transition region encompasses the omission of the transition region.

Furthermore, in order to solve the above-identified problem, a vehicle surrounding-area monitoring apparatus according to the present invention may include: a notable video image generation unit generating a narrow view-field region as a notable video image, the narrow view-field region being part of a video image of an area surrounding a vehicle obtained by an imaging unit; an obstacle recognition unit recognizing an obstacle in the area surrounding the vehicle; an obstacle region calculation unit calculating an obstacle region, the obstacle region being a region, in the video image, of the obstacle recognized by the obstacle recognition unit; a notable obstacle image generation unit generating a notable obstacle image containing at least the obstacle region from the video image if the obstacle region is located outside of the narrow view-field image; an indicator image generation unit outputting an indicator image that indicates the relative position of the notable obstacle image with respect to the vehicle; and an image merge unit merging the notable obstacle image, the indicator image, and the notable video image so as to display the notable obstacle image as a pop-up on a monitor screen.

According to this configuration, under normal conditions, a narrow view-field region, which is a region of particular importance for vehicle traveling, may be generated as a notable video image from a video image that is a wide view-field image obtained by the imaging unit and displayed on a monitor. This allows the driver to confirm it is safe to travel in the narrow view-field region. Furthermore, if an obstacle is recognized outside of the narrow view-field, an obstacle region, which is a video region in the video image of the obstacle, is calculated and a notable obstacle image containing the obstacle region is displayed as a pop-up on the monitor screen where the notable video image is displayed. Also displayed at this moment as a pop-up on the same monitor screen is an indicator image representing an indicator that indicates the relative position of the obstacle shown in the notable obstacle image displayed as a pop-up with respect to the vehicle. Accordingly, the driver can recognize not only the recognized obstacle through the pop-up display of the notable obstacle image showing the obstacle but also the relative position of the obstacle with respect to the vehicle through the indicator image likewise displayed as a pop-up.

BRIEF DESCRIPTION OF THE DRAWINGS

FIG. 13 is a schematic diagram for describing the display of the notable obstacle image and the notable video image in the surrounding-area monitoring image according to an alternative embodiment.

BEST MODE FOR CARRYING OUT THE INVENTION

1. First Embodiment

Figure 1:
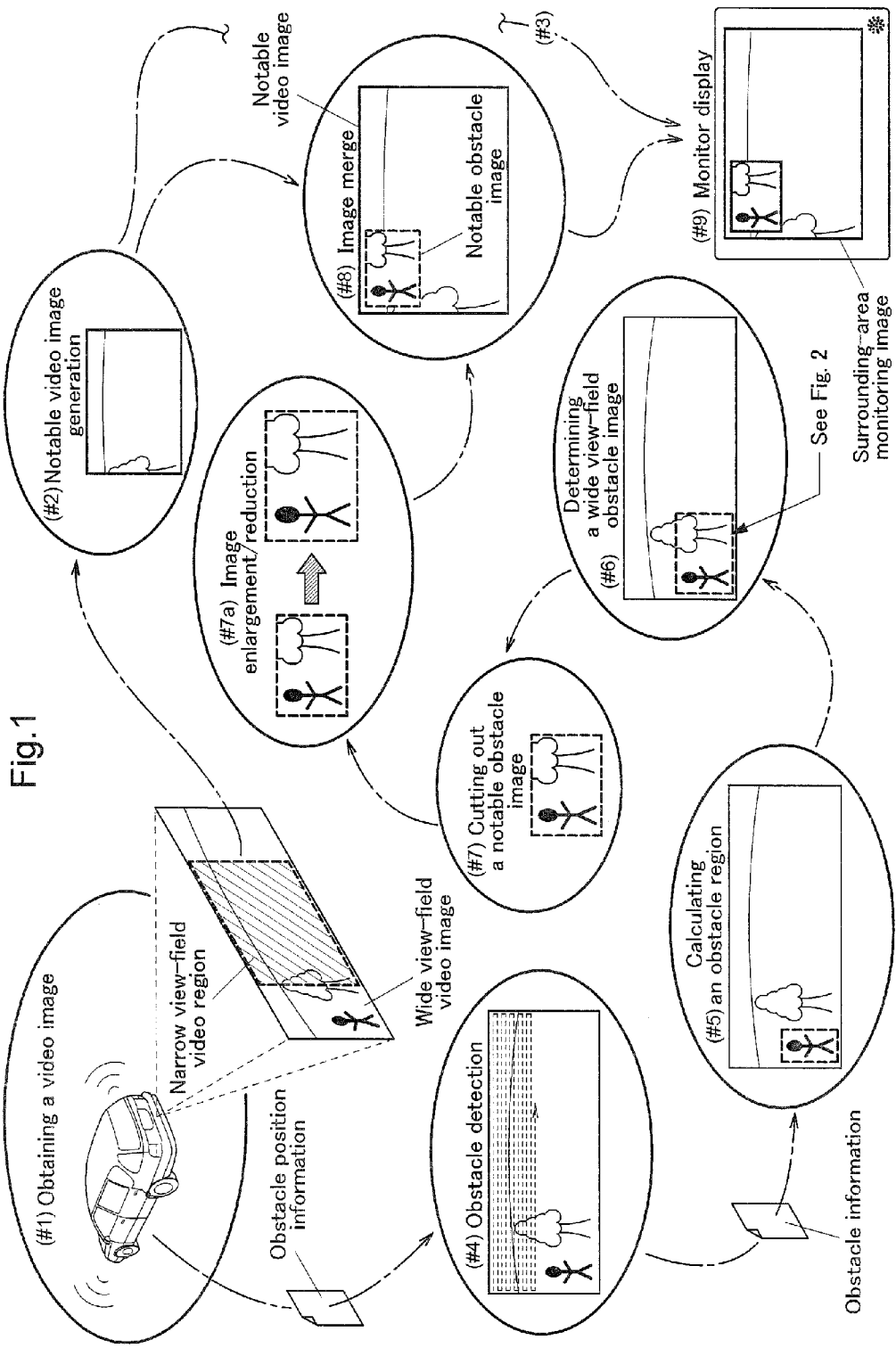
FIG. 1 is a schematic diagram for describing the basic system of the vehicle surrounding-area monitoring apparatus according to a first embodiment of the present invention.
Figure 2:
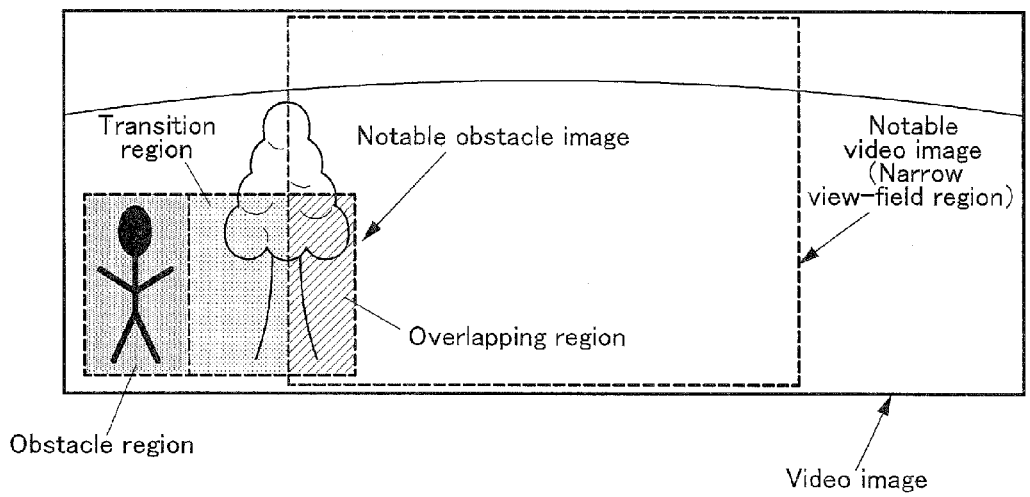
FIG. 2 is a schematic diagram for describing the basic flow of the image processing in the vehicle surrounding-area monitoring apparatus according to the first embodiment of the present invention.

Before describing the specifics of the vehicle surrounding-area monitoring apparatus of the first embodiment according to the present invention, the exemplary basic system of the present invention is explained with reference to the schematic diagrams of FIGS. 1 and 2. In the exemplary system, a rear camera mounted on the vehicle is applied as the imaging unit and the rear monitoring routine started by the vehicle surrounding-area monitoring apparatus for rear safety check while reversing will be described below.

A video image is obtained by the rear camera. This video image is a wide view-field video image covering a substantial part of the surrounding area rear of the vehicle (#1). A narrow view-field video image obtained by cutting out the center portion of the obtained wide view-field video image (the narrow view-field region) is generated as a notable video image (#2). This notable video image is displayed on the monitor for rear monitoring (#3).

At the same time, the wide view-field video image is subjected to image recognition processing to recognize any obstacles (#4). For this purpose, a target region for obstacle recognition may be advantageously narrowed down from the wide view-field video image based on information about an obstacle location obtained by an obstacle detection apparatus of the ultrasonic or laser radar type.

Once an obstacle is recognized via the image processing, the location of the obstacle in the wide view-field video image (the obstacle region) is calculated (#5). If the recognized obstacle is located in the narrow view-field video image, the driver can be made aware of the obstacle via the monitor as the obstacle showing the obstacle is also displayed on the monitor along with the narrow view-field video image. To make the driver take clear notice of the obstacle, the obstacle may be emphasized, for example, by enclosing the obstacle image region with bold lines. In contrast, if no obstacle is present in the narrow view-field video image, but one is present elsewhere in the video image outside of the narrow view-field video image, the obstacle won't be displayed on the monitor. In this case, therefore, an obstacle region is cut out from the video image for display on the monitor. According to the present invention, however, unlike in Patent Document 3, the obstacle region is not simply clipped from the video image and pasted in an appropriate place on the narrow view-field video image.

If the obstacle region is outside of the narrow view-field image, first, a wide view-field obstacle image is determined that is focused on the obstacle and comprised of the obstacle region, a transition region transitioning from the obstacle region to the narrow view-field region, and an overlapping region extending into the narrow view-field region from the transition region (#6). That is, the image region of this wide view-field obstacle image is an image region continuous from the overlapping region, which is in the periphery of the narrow view-field region in the video image used as the notable video image, to the obstacle region via the transition region. The overlapping region is a region where the wide view-field obstacle image overlaps the narrow view-field region. The image region containing at least the obstacle region and the overlapping region of the notable obstacle image is cut out from the wide view-field video image as a notable obstacle image (#7). As this notable obstacle image includes part of the periphery of the notable video image (the narrow view-field region) displayed on the monitor as the overlapping region, the positional relationship between the notable obstacle image and the notable video image can be easily grasped from the notable obstacle image. The size of the notable obstacle image is determined according to the size of the obstacle region and the distance of the obstacle region from the narrow view-field region. Accordingly, if the notable obstacle image is too large for the purpose of monitor display, the notable obstacle image may be reduced or the transition region may be omitted or compressed. If the notable obstacle image is too small, the notable obstacle image may be enlarged (#7*a*). Once generated, the notable obstacle image is merged with the notable video image and output as a surrounding-area monitoring image (#8). The surrounding-area monitoring image is displayed on the monitor and one example of such display is in the form of a pop-up on the notable video image (#9). In that case, as the upper region of the notable video image is likely to show the sky or other objects with a relatively minor influence on vehicle traveling, it is advantageous to display the notable obstacle image as a pop-up on the upper region of the notable video image. In any case, with the notable obstacle image displayed on the monitor, the driver can confirm the obstacle on the monitor.

With reference to the drawings, a vehicle surrounding-area monitoring apparatus according to the present invention will be described hereafter.

Figure 3:
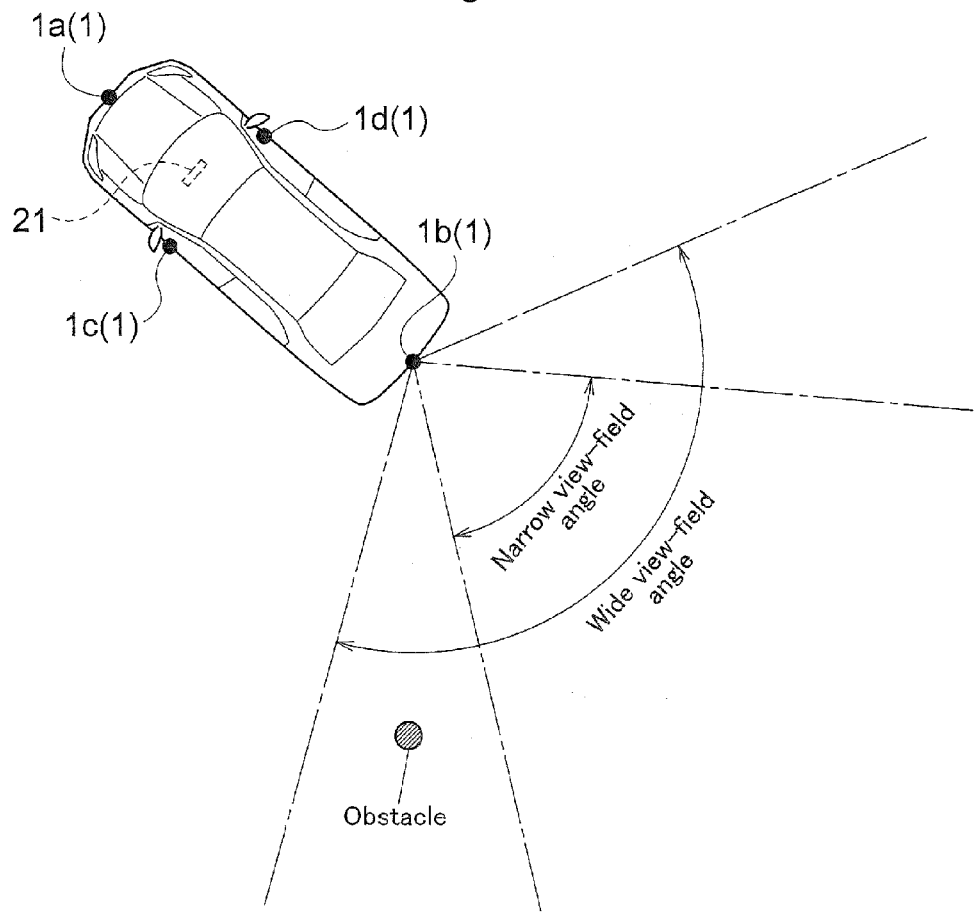
FIG. 3 is a schematic diagram for describing a wide view-field image and a narrow view-field image according to the first embodiment of the present invention.

As shown in FIG. 3, this vehicle surrounding-area monitoring apparatus assists the driver in checking the area surrounding the vehicle using video images obtained by imaging units or cameras 1 mounted on a vehicle, which is a passenger car in this case, for imaging the area surrounding the vehicle. To monitor the area surrounding the vehicle in all directions, a front camera 1*a* whose image capture field of view is forward of the vehicle, a rear camera 1*b* whose image capture field of view is rearward of the vehicle, right and left side cameras 1*c*, 1*d* whose image capture fields of view are to the right and left of the vehicle, are required as the cameras 1. In this embodiment, the rear camera 1*b* is selected as representing the cameras 1 and simply referred to as the camera 1 hereafter. Video images obtained by the camera 1 are used by a vehicle surrounding-area monitoring controller 2, described in further detail below, to generate images for obstacle recognition and surrounding-area monitoring. Images generated for monitoring the surrounding area are displayed on the monitor 21.

The camera 1 is a digital camera with built-in imaging devices, such as CCDs (charge coupled devices) or CISs (CMOS image sensors) and outputs information imaged by the imaging devices as moving image information or still image information in real time. The imaging centerline of the camera 1 extends slightly downward. As can be schematically seen in FIG. 3, provided with a wide-angle lens of about 140 degrees, the camera 1 obtains video images with a wide field of view. A super wide-angle lens having a horizontal field of view of 180 degrees may be used to cover the entire area rear of the vehicle. The narrow view-field angle shown in FIG. 3 is selected for obtaining a narrow field of view minimally required to check the estimated traveling path condition for the vehicle traveling. If an obstacle is present in this narrow field of view, there is the possibility of a collision. Accordingly, it is important to draw the attention of the driver when an obstacle, especially one that is heading for the narrow field of view, is present in the wide field of view outside of the narrow field of view.

Figure 4:
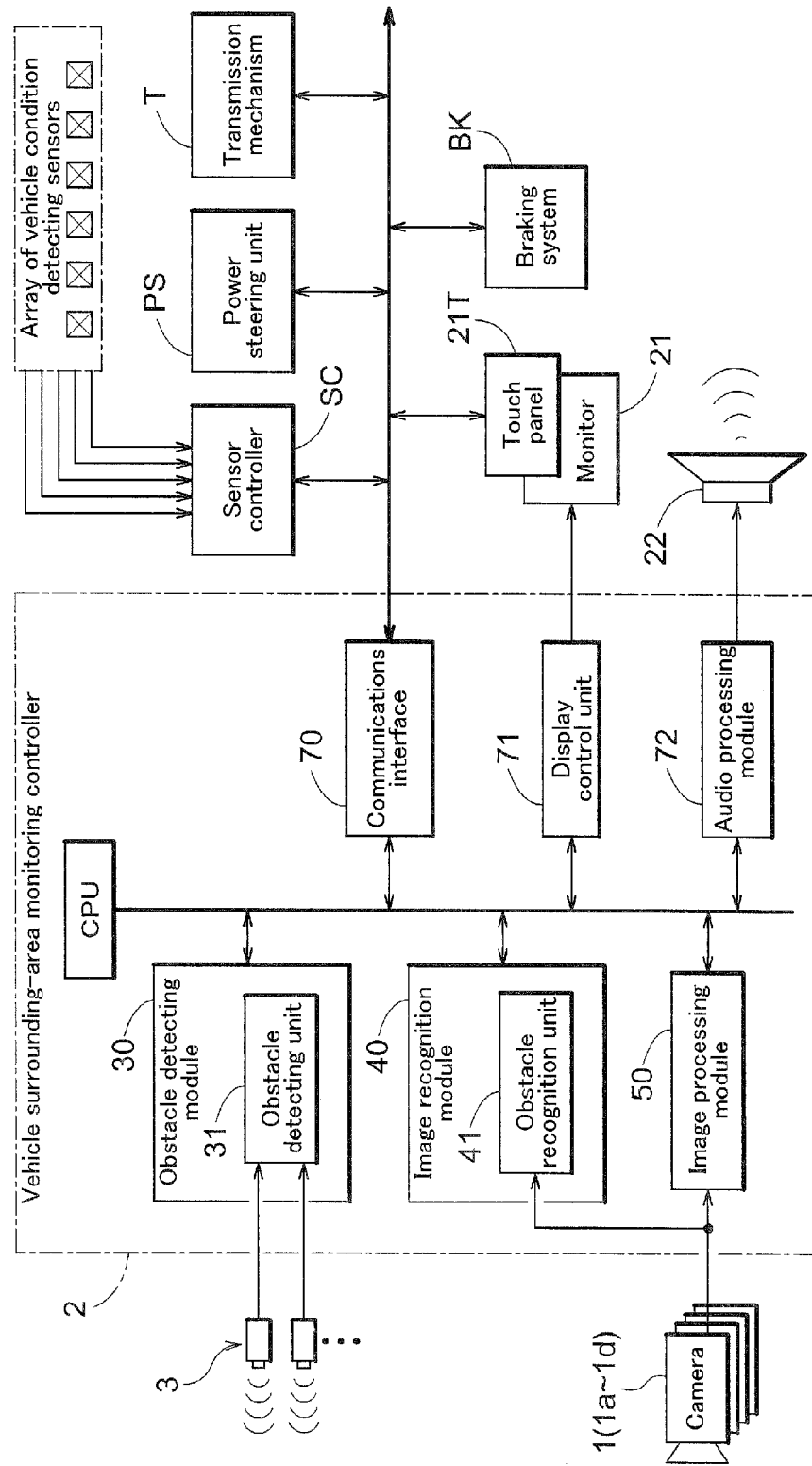
FIG. 4 is a functional block diagram of one implementation of the vehicle surrounding-area monitoring apparatus according to the first embodiment of the present invention.

The vehicle surrounding-area monitoring controller 2, mounted within the vehicle, constitutes the core of the vehicle surrounding-area monitoring apparatus. As shown in FIG. 4, the vehicle surrounding-area monitoring controller 2 comprises a microprocessor and a DSP (digital signal processor) for processing input information and is capable of exchanging data with various onboard equipment via a communications interface 70 that serves as input-output interface. For example, a sensor controller SC, a monitor 21, a touch panel 21T, a power steering unit PS, a transmission mechanism T, a braking system BK, etc., are connected with the onboard LAN, which is connected with the communications interface 70. The sensor controller SC transmits signals input from an array of vehicle condition detecting sensors into the vehicle surrounding-area monitoring controller 2, as is or after evaluation. The array of vehicle condition detecting sensors connected to the sensor controller SC detects vehicle maneuvers and vehicle traveling conditions. The array of vehicle condition detecting sensors includes, although not shown, a steering sensor for measuring the steering direction (the direction of steerage) and the amount of control (the amount of steering), a shift position sensor for determining the shift position of the shift lever, an acceleration sensor for measuring the amount of operation of the accelerator pedal, a braking sensor for detecting the amount of operation of the braking pedal, and a distance sensor for detecting the traveling distance of the own vehicle.

The vehicle surrounding-area monitoring controller 2 is a computer system comprising a variety of functional units constituted by hardware, software, or a combination of both. The functional units of particular relevance to the present invention include an obstacle detecting module 30 for detecting obstacles around the vehicle, a image recognition module 40, an image processing module 50, the above-described communications interface 70, a display control unit 71, and an audio processing module 72. Images for monitor display created by the image processing module 50 are converted to video signals by the display control unit 71 and sent to the monitor 21. Voice guidance and emergency warning sounds created by the audio processing module 72 are sounded by a speaker 22.

Provided in the obstacle detecting module 30 is an obstacle detecting unit 31 for detecting obstacles by evaluating detection signals from a plurality of ultrasound sensors 3. The ultrasound sensors 3, disposed at both end portions and the center of each of the front, rear, left side, and right side of the vehicle, are capable of detecting objects (obstacles) present in the vicinity of the vehicle via waves reflected off the objects. With its excellent ability to calculate the distances to or the locations of the obstacles, the obstacle detecting unit 31 is capable of estimating the distances from the vehicle to the objects and the sizes of the objects by processing the return times and amplitudes of the reflected waves at the respective ultrasound sensors 3. Furthermore, it is also possible to estimate the movements and the lateral external shapes of the objects by processing the results of detection performed by all the ultrasound sensors 3 over time. The obstacle detecting module 30 outputs obstacle information describing the locations, attitudes, and sizes of the recognized obstacles to the image recognition module 40. An alternative system may be applied, including one that employs a laser radar as the obstacle detecting unit 31. Alternatively, the obstacle detecting unit 31 may be configured to detect obstacles by performing image recognition on video image from the onboard camera 1.

The image recognition module 40 is provided with an obstacle recognition unit 41 for using video images of the original size from the onboard camera 1, i.e., wide view-field video image, to recognize obstacles. The obstacle recognition unit 41 has an object recognition algorithm, which itself is known, implemented therein for recognizing obstacles around the vehicle from input individual video images and chronologically sequential video images. For the purpose of determining the presence and location of an obstacle, one of the obstacle detecting unit 31 and the obstacle recognition unit 41 will suffice; however, more accurate obstacle recognition is possible through the cooperation between the obstacle recognition unit 41, capable of detecting the presence of an obstacle by using the video images originally created for display purposes, and the obstacle detecting unit 31, with its excellent ability to calculate the location of an object.

Figure 5:
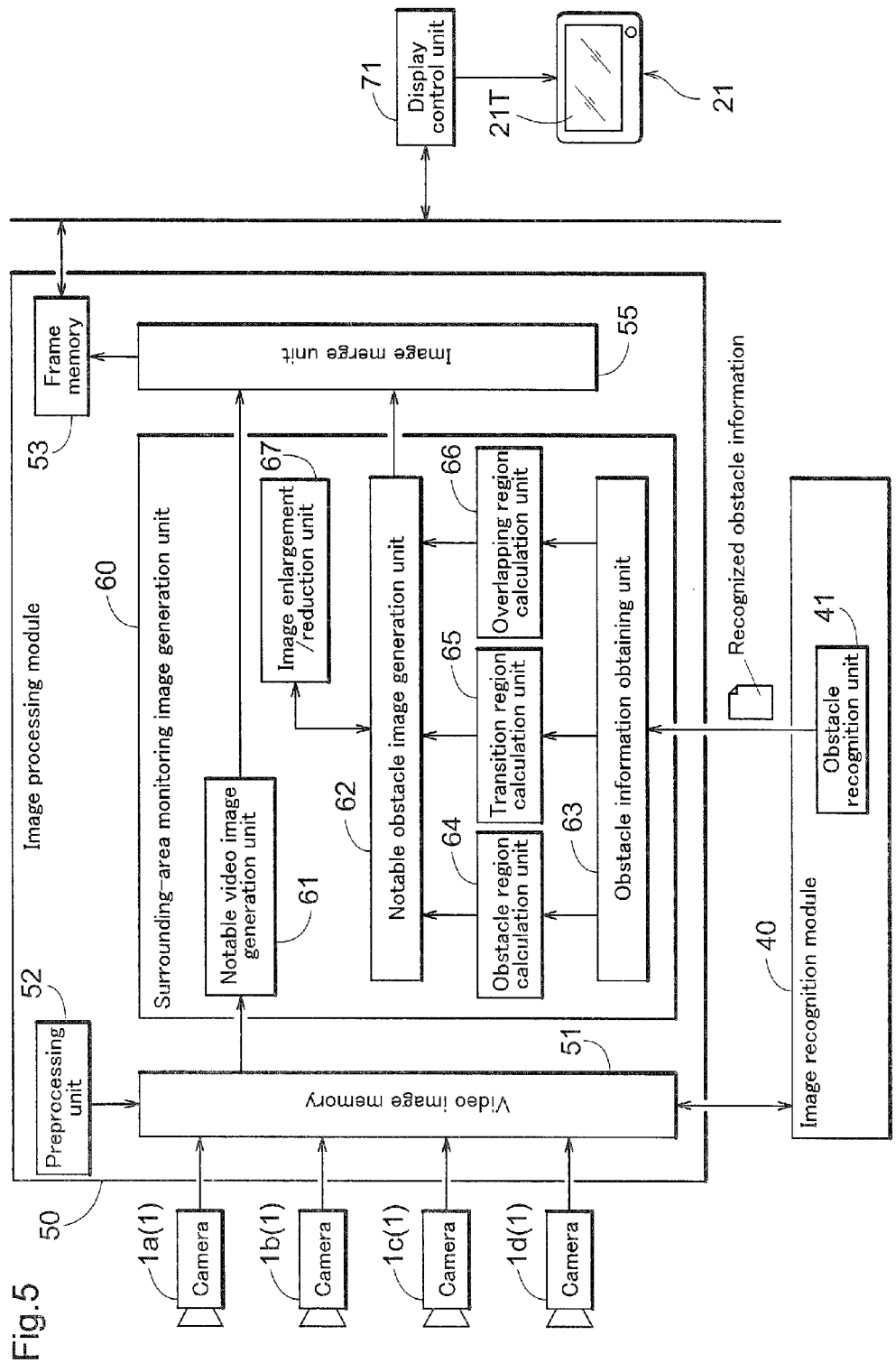
FIG. 5 is a functional block diagram of the image processing module according to the first embodiment of the present invention.

FIG. 5 shows a functional block diagram of the image processing module 50. The image processing module 50 is also a computer unit, thus capable of implementing various functions upon activation of programs. In the image processing module 50, programs and hardware implement the various functions necessary to process wide view-field video images sent from the camera 1 and deployed in the memory for outputting surrounding-area monitoring images. During that process, obstacle information sent from one or both of the image recognition module 40 and the obstacle detecting module 30 are referenced to incorporate an obstacle image into the surrounding-area monitoring image in a manner that facilitates object recognition. The functional units of particular relevance to the present invention includes, as shown in FIG. 5, a video image memory 51, a preprocessing unit 52, a surrounding-area monitoring image generation unit 60, and a frame memory 53. Video images obtained by the camera 1 are deployed in the video image memory 51, such that the preprocessing unit 52 may adjust the brightness and color balances, etc., between video images individually obtained by the camera 1.

The surrounding-area monitoring image generation unit 60 includes a notable video image generation unit 61, a notable obstacle image generation unit 62, an obstacle information obtaining unit 63, an obstacle region calculation unit 64, a transition region calculation unit 65, an overlapping region calculation unit 66, and an image enlargement/reduction unit 67. The notable video image generation unit 61 cuts out a center region set in advance in the wide view-field video image (the narrow view-field region) deployed in the video image memory 51 as a notable video image (a narrow view-field video image) and sends it to an image merge unit 55.

When an obstacle is recognized outside of the above-described narrow view-field region in the video image deployed in the video image memory 51, the notable obstacle image generation unit 62 generates a notable obstacle image containing the obstacle image. The notable obstacle image is basically comprised of an obstacle region in the video image calculated by the obstacle region calculation unit 64, a transition region in the video image calculated by the transition region calculation unit 65, and an overlapping region in the video image calculated by the overlapping region calculation unit 66.

The obstacle region calculation unit 64 computes a rectangular region containing a recognized obstacle as the obstacle region based on obstacle information including the location of the obstacle in the video image sent from the obstacle recognition unit 41. The transition region calculation unit 65 calculates, as the transition region, the region defined by the locus of the movement of the obstacle region outside the narrow view-field region toward the center of the vehicle. The overlapping region calculation unit 66 calculates a region extended from the transition region into the narrow view-field region as the overlapping region. It is advantageous to set the overlapping region in advance. Preferably, its width is one-third to one-fifth of the width of the notable obstacle image, but is not so limited. Since the obstacle region, the transition region, and the overlapping regions are connected, the notable obstacle image is continuous from a specific peripheral region of the notable video image.

In this embodiment, this notable obstacle image is displayed as a pop-up on the notable video image. Accordingly, if the mode of display is such that, in particular, the notable obstacle image is displayed as a pop-up on the notable video image, the notable obstacle image may almost completely hide the notable video image depending on the displayed area of the notable obstacle image. Therefore, if the displayed area of the notable obstacle image is a predetermined size or more, the image needs to be reduced. If the notable obstacle image has too small an area for recognition of the obstacle, it is certainly necessary to enlarge the image. Additionally, if the transition region is too long, the transition region is compressed (reduced in size). Such enlargement/size reduction of notable obstacle images and compression of transition regions are performed by the image enlargement/reduction unit 67. The notable obstacle image, which is either subjected to image enlargement/reduction or requires no image enlargement/reduction, is sent to the image merge unit 55.

Figure 6:
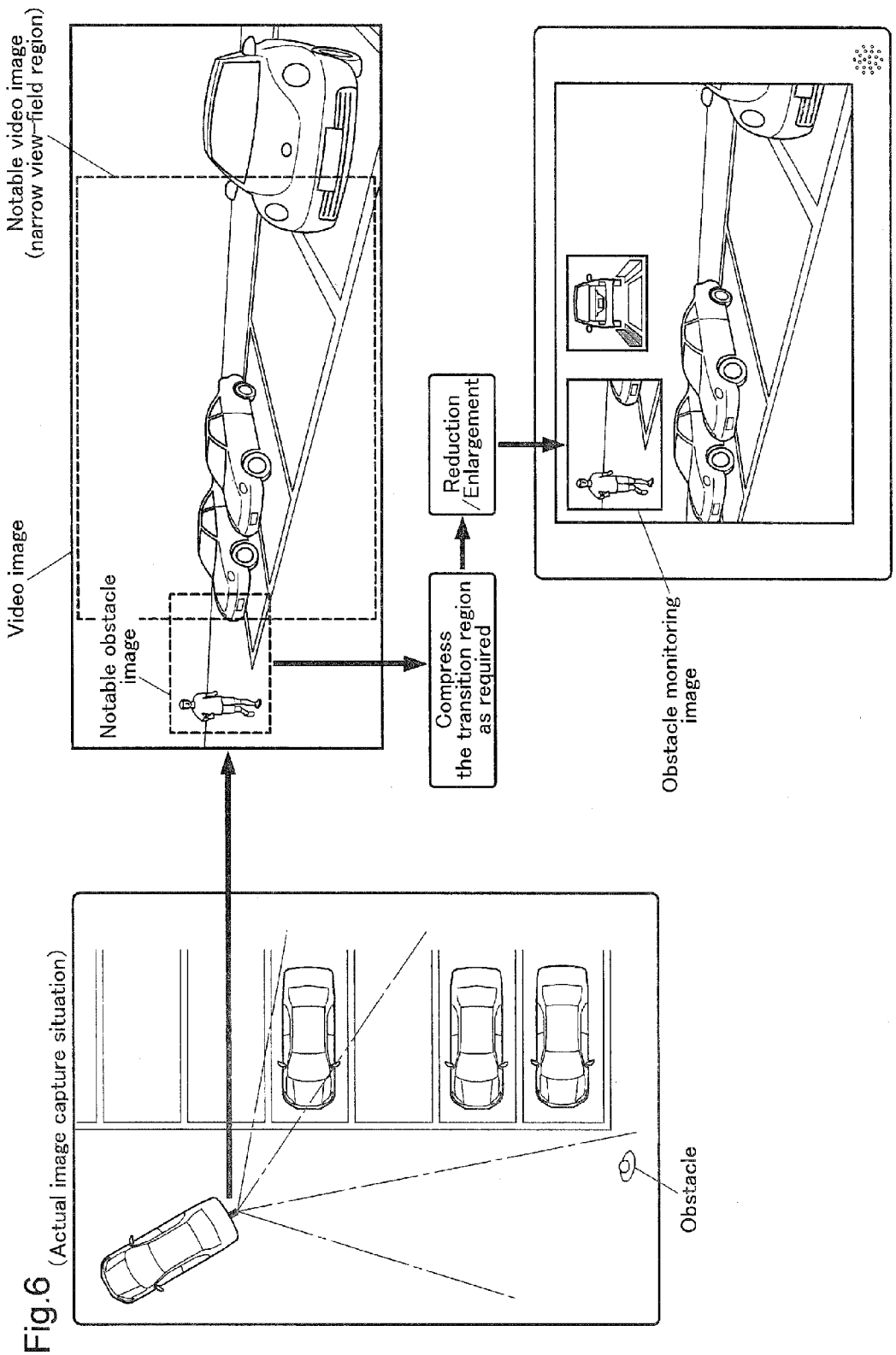
FIG. 6 is a schematic diagram for describing the placement of the notable obstacle image and the notable video image in the surrounding-area monitoring image according to the first embodiment of the present invention.

In this embodiment, as shown in FIG. 6, the image merge unit 55 merges the notable obstacle image with the notable video image in such a manner as to display the notable obstacle image in the upper portion of the notable video image on the side of the notable video image closer to the obstacle. In the example of FIG. 6, an absence-of-obstacle monitoring image is also merged with the notable video image on the opposite side of the notable obstacle image such that an image region located symmetrically with the notable obstacle region about the vehicle is displayed as the absence-of-obstacle monitoring image.

The driver can recognize the obstacle from the notable obstacle image. However, in order to more clearly make the driver aware of the presence of the obstacle, a rear view (an icon will also suffice) of the vehicle and an indicator for indicating the direction in which the obstacle exists relative to the vehicle are displayed on the upper middle portion of the notable video image. Furthermore, the notable obstacle image itself may be enclosed with a thick red or black line or the outlines of the obstacle region may be enclosed with a thick red or black line. The resulting merged image is transmitted to the frame memory 53 as a surrounding-area monitoring image and displayed on the monitor 21 via the display control unit 71.

When merging the notable obstacle image with the notable video image, it is preferable to place the notable obstacle image on the left-hand side of the monitor screen if the obstacle is present to the left of the notable video image, and place the notable obstacle image on the right-hand side of the monitor screen if the obstacle is present to the right of the notable video image. This allows the driver to immediately know in which direction the obstacle is located with respect to the driver. This advantageously provides excellent visual recognition.

Once an obstacle is recognized, it is advantageous to emphasize the recognized obstacle in the notable obstacle image containing the obstacle in a manner that makes the obstacle conspicuous, such as enclosing the obstacle within a frame (marking) as this facilitates identification of the obstacle.

Figure 7:
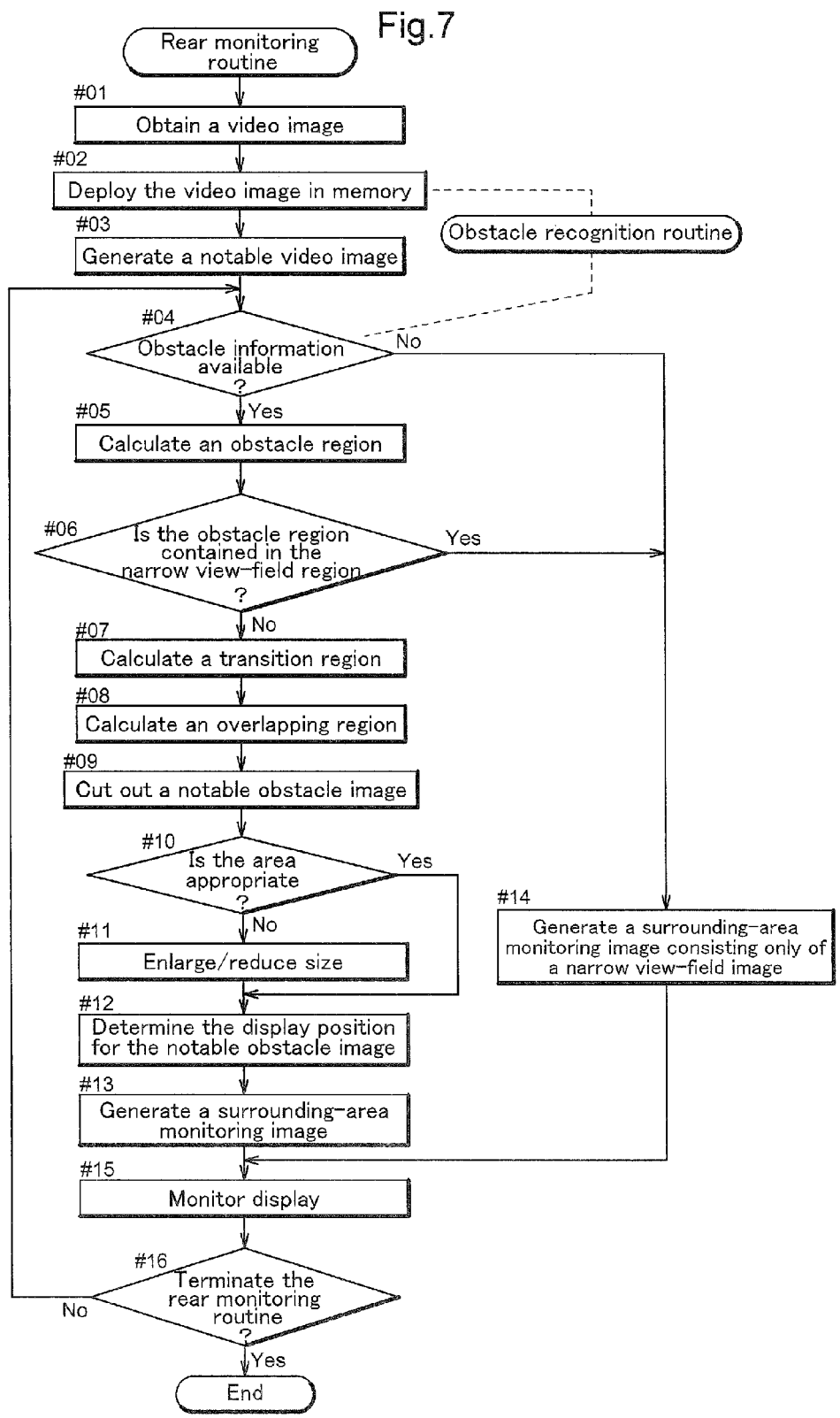
FIG. 7 is a flowchart representing one example of the rear monitoring routine performed by the vehicle surrounding-area monitoring apparatus according to the first embodiment of the present invention.

One example of the rear monitoring routine that represents the control operation for rear safety check in the vehicle surrounding-area monitoring apparatus constructed as above is described with reference to the schematic diagram of the control routine of FIG. 6 and the flowchart of FIG. 7.

First, upon start of the rear monitoring routine, camera 1 obtains video images (wide view-field images) (#01). The obtained video images are sequentially deployed in the memory to temporarily store images of a predetermined duration (#02). The video images deployed in the memory are subjected to correction of distortion, resolution conversion, level adjustments and other necessary image processing. These stored video images are also used by the simultaneously executing obstacle recognition routine. As recognition algorithms for recognizing objects having relative movements (they become obstacles if located near vehicle traveling paths) from video images obtained in a chronological sequence are well known, their description herein is omitted.

The notable video image generation unit 61 cuts out an image as a notable video image using a predetermined frame for cutting out a narrow view-field region (#03). Next, it is checked whether obstacle information has been output by the obstacle recognition unit 41 (#04). If obstacle information has been output, the obstacle region calculation unit 64 reads the coordinate position of the obstacle on the video image from the obstacle information and calculates the obstacle region (#05). It is then checked whether or not the obstacle region identified on the video image is contained in the narrow view-field region, in other words, whether or not the recognized obstacle is visible in the notable video image displayed on the monitor (#06). At this point, it is advantageous to regard the obstacle region identified on the video image as not being contained in the narrow view-field region if a part or the entirety of the obstacle region is located outside of the narrow view-field region. If it is determined by this checking that the obstacle region is not contained in the narrow view-field image region (the No branch at #06), the transition region calculation unit 65 then calculates the transition region in the video image (#07) and the overlapping region calculation unit 66 calculates the overlapping region (#08). Subsequently, a notable obstacle image is cut out from the video image based on the calculated obstacle region, transition region, and overlapping region (#09). The display area of the notable obstacle image is checked (#10) and only if enlargement/reduction is required, the notable obstacle image is subjected to enlargement/reduction, including compression of the transition region (#11). The notable obstacle image thus generated by the notable obstacle image generation unit 62 is displayed on the monitor as an obstacle monitoring image and the display (pop-up) location of the notable obstacle image on the notable video image is determined based on the direction of the obstacle with respect to the vehicle (#12). Next, the image merge unit 55 merges the notable video image with the notable obstacle image to create a surrounding-area monitoring image, which is subsequently outputted (#13). It should be noted that in FIG. 6, only one notable obstacle image is shown on the upper left portion, a notable obstacle image (a dummy notable obstacle image symmetrical with the notable obstacle image about the vehicle center) may be merged on the side where no obstacle is present. This allows the driver to recognize that an obstacle is present in one direction while no obstacle is present in the other direction. If the checking at the foregoing step #04 indicates that no obstacle information is output (the No branch at #04), the notable video image (the narrow view-field image) circumvents the image merger unit 55 and is output as the surrounding-area monitoring image (#14).

The surrounding-area monitoring image output by the image merge unit 55 is sent to the display control unit 71 to display on the monitor 21 a screen view corresponding to that image. It is checked if a command has been issued for termination of the rear monitoring routine (#16) and as long as the rear monitoring continues (the No branch at #16), the process returns to #04 to repeat the foregoing process using the latest video images.

2. Second Embodiment

Figure 8:
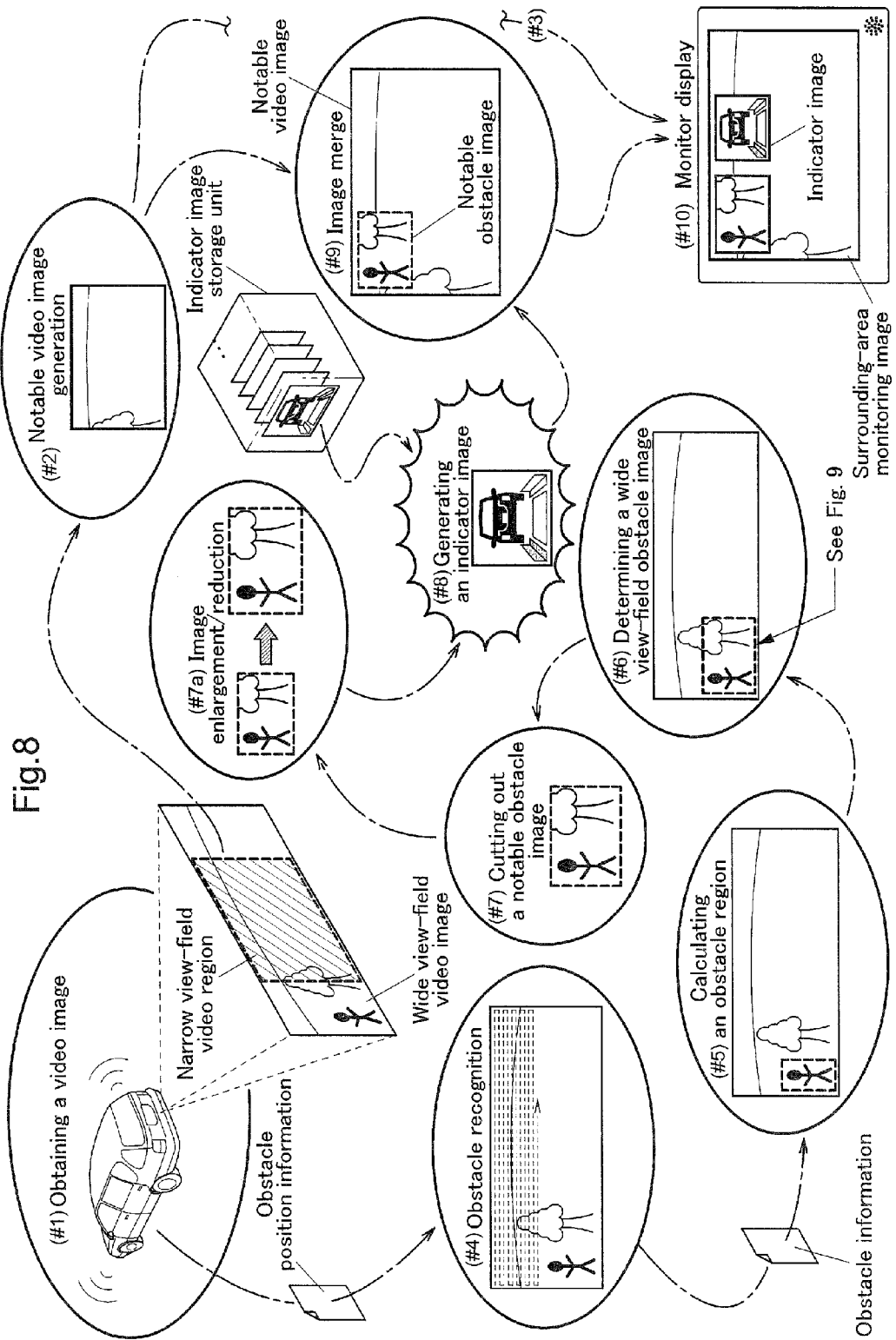
FIG. 8 is a schematic diagram for describing the basic system of the vehicle surrounding-area monitoring apparatus according to a second embodiment of the present invention.

Before describing the specifics of the vehicle surrounding-area monitoring apparatus of the second embodiment according to the present invention, the exemplary basic system of the present invention is explained with reference to the schematic diagrams of FIGS. 8 and 9. In this exemplary system, a rear camera mounted on the vehicle is applied as the imaging unit. This rear camera is mounted, for example, with its optical axis inclined slightly downward with respect to the horizontal direction. The back monitoring routine started by the vehicle surrounding-area monitoring apparatus for rear safety check while reversing will be described below.

A video image is obtained by the rear camera. This video image is a wide view-field video image covering a substantial part of the surrounding area rear of the vehicle (#1). This video image, for example, shows such objects as the sky and the rooftops of buildings in its upper portion and road surfaces in its lower portion. When displaying an image captured by the rear camera (including a video image and a narrow view-field video image, a notable obstacle image, etc., which are part of the video image) on the monitor for rear monitoring, the image captured by the rear camera is shown in lateral inversion (mirror image display) to match the view on the rear-view mirror. The lateral inversion of the video image may be performed before it is output from the rear camera or immediately before it is displayed on the monitor, or in any suitable process therebetween. For example, one possible mode of performing lateral inversion is outputting the image captured by the rear camera to a vehicle surrounding-area monitoring controller where the lateral inversion is performed. For the ease of description, it is assumed herein that a laterally inverted video image is output from the rear camera. Furthermore, video images thus laterally inverted are also simply referred to as video images. A narrow view-field video image obtained by cutting out the center portion of the obtained wide view-field video image (the narrow view-field region) is generated as a notable video image (#2). This notable video image is displayed on the monitor for rear monitoring (#3).

At the same time, the wide view-field video image is subjected to image recognition processing to recognize any obstacles (#4). In that case, a target region for obstacle recognition may be advantageously narrowed down from the wide view-field video image based on information about an obstacle location obtained by an obstacle detection apparatus of the ultrasonic or laser radar type.

Once an obstacle is recognized via the image processing, the location of the obstacle in the wide view-field video image (the obstacle region) is calculated (#5). If the recognized obstacle is located in the narrow view-field video image, the driver can be aware of the obstacle via the monitor as the obstacle showing the obstacle is also displayed on the monitor along with the narrow view-field video image. To make the driver take clear notice of the obstacle, the obstacle may be emphasized, for example, by enclosing the obstacle image region with bold lines. In contrast, if no obstacle is present in the narrow view-field video image, but one is present elsewhere in the video image outside of the narrow view-field video image, the obstacle won't be displayed on the monitor.

If the obstacle region is outside of the narrow view-field image, a wide view-field obstacle image clipped from the wide view-field video image in a manner as to contain the obstacle region is generated as the notable obstacle image to be displayed as a pop-up on the notable video image. In this exemplary configuration, a preferred implementation of a wide view-field obstacle image clipped from the wide view-field video image is employed. More particularly, an image comprised of the obstacle region, a transition region transitioning from the obstacle region to the narrow view-field region, and an overlapping region extending into the narrow view-field region from the transition region, is determined as the wide view-field obstacle image (#6). Here, this wide view-field obstacle image is an image region continuous from the overlapping region, which is in the periphery of the narrow view-field region in the video image used as the notable video image, to the obstacle region via the transition region. The overlapping region is a region where the wide view-field image overlaps the narrow view-field region. The image region containing at least the obstacle region and the overlapping region of the notable obstacle image is cut out from the wide view-field video image as a notable obstacle image (#7). As this notable obstacle image includes part of the periphery of the notable video image (the narrow view-field region) displayed on the monitor as the overlapping region, the positional relationship between the notable obstacle image and the notable video image can be easily grasped from the notable obstacle image. The size of the notable obstacle image is determined according to the size of the obstacle region and the distance of the obstacle region from the narrow view-field region. Accordingly, if the notable obstacle image is too large for the purpose of monitor display, the notable obstacle image may be reduced or the transition region may be omitted or compressed. If the notable obstacle image is too small, the notable obstacle image may be enlarged (#7a).

An indicator image to be displayed as a pop-up on the notable video image is generated concurrently with the generation of the notable obstacle image (#8). The indicator image indicates the relative position of the notable obstacle image with respect to the vehicle and the relative position of the recognized obstacle with respect to the vehicle. In the example shown in FIG. 9, the indicator image is comprised of an illustrated or photographic image of the vehicle and an illustrated image displayed simultaneously with this indicator image for graphically showing the region of location of the obstacle contained in the notable video image with respect to the vehicle. In other words, herein, the image of the vehicle and the image indicating the region of location of the obstacle with respect to the vehicle are collectively referred to as the indicator image. The illustrated or photographic image of the vehicle in FIG. 9 is an illustrated or photographic image of the vehicle seen from behind the vehicle. As an alternative indicator image, a grid pattern may be drawn around the vehicle image wherein the location of the obstacle can be specified by filling in the location of the obstacle in the grid or drawing emphasis lines in that location. As the locations of recognized obstacles can be anticipated, it is convenient to iconize and store indicator images corresponding to these obstacle locations.

Figure 9:
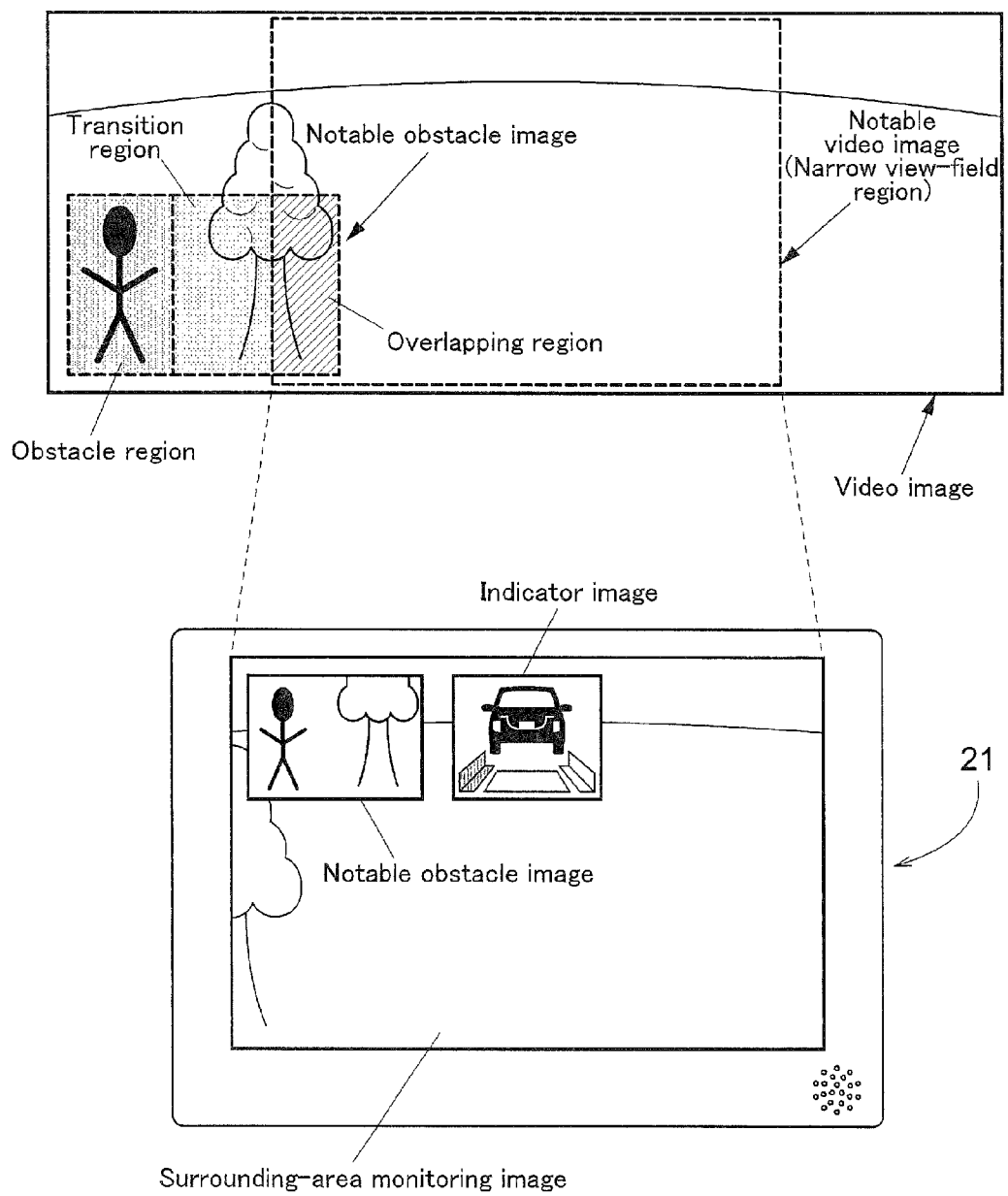
FIG. 9 is a schematic diagram for describing the basic flow of the image processing in the vehicle surrounding-area monitoring apparatus according to the second embodiment of the present invention.

In the example of FIG. 9, the notable obstacle image is displayed to the left of the indicator image on the monitor, indicating that the notable obstacle image shows an obstacle located to the rear left of the vehicle as shown in FIG. 3. In other words, the relative position (direction) of the obstacle shown in that notable obstacle image with respect to the vehicle corresponds to the relative position (direction) of the notable obstacle image displayed as a pop-up with respect to the indicator image on the monitor. In other words, the relative position (direction) of the obstacle shown in that notable obstacle image with respect to the vehicle matches the relative position (direction) of the notable obstacle image displayed as a pop-up with respect to the indicator image on the monitor. Due to this display, the actual direction in which the obstacle is located matches the direction of the location of the notable obstacle image displayed as a pop-up with respect to the indicator image on the monitor, effectively facilitating the understanding by the driver of the location (direction) of the obstacle.

Once the notable obstacle image and the indicator image are generated, the notable obstacle image and the indicator image are merged with the notable video image for displaying these images as pop-ups on the notable video image, which is then outputted as a surrounding-area monitoring image (#9) and displayed on the monitor (#10).

With reference to the drawings, a vehicle surrounding-area monitoring apparatus according to the present invention will be described hereafter. As in the above-described first embodiment, as shown in FIG. 3, this vehicle surrounding-area monitoring apparatus assists the driver in checking the area surrounding the vehicle using video images obtained by imaging units or cameras 1 mounted on a vehicle, which is a passenger car in this case, for imaging the area surrounding the vehicle. To monitor the area surrounding the vehicle in all directions, a front camera 1a whose capturing view field is in the forward of the vehicle, a rear camera 1b whose capturing view field is in the rear of the vehicle, right and left side cameras 1c, 1d whose capturing view fields are to the right and left of the vehicle, are required as the cameras 1. In this embodiment, the rear camera 1b is selected as representing the cameras 1 and simply referred to as the camera 1 hereafter. Video images obtained by the camera 1 are used by a vehicle surrounding-area monitoring controller 2, described in further detail below, to generate images for obstacle recognition and surrounding-area monitoring. Images generated for monitoring the surrounding area are displayed on the monitor 21.

The camera 1 is a digital camera with built-in imaging devices, such as CCDs (charge coupled devices) or CISs (CMOS image sensors) and outputs information imaged by the imaging devices as moving image information or still image information in real time. The imaging centerline of the camera 1 extends slightly downward. As can be schematically seen in FIG. 3, provided with a wide view angle lens of about 140 degrees, the camera 1 obtains video images with a wide field of view. A super wide angle lens having a horizontal field of view of 180 degrees may be certainly used to cover the entire area rear of the vehicle. The narrow view-field angle shown in FIG. 3 is selected for obtaining a narrow field of view minimally required to check the estimated traveling path condition for the vehicle traveling. If an obstacle is present in this narrow field of view, there is a possibility of collision. Accordingly, it is important to draw attention of the driver when an obstacle, especially one that is heading for the narrow field of view, is present in the wide field of view outside of the narrow field of view.

The vehicle surrounding-area monitoring controller 2, mounted within the vehicle, constitutes the core of the vehicle surrounding-area monitoring apparatus. As in the above-described first embodiment, as shown in FIG. 4, the vehicle surrounding-area monitoring controller 2 comprises a microprocessor and a DSP (digital signal processor) for processing inputted information and is capable of exchanging data with various onboard equipment via a communications interface 70 serving as input-output interface. For example, a sensor controller SC, a monitor 21, a touch panel 21T, a power steering unit PS, a transmission mechanism T, a braking system BK, etc., are connected with the onboard LAN, which is connected with the communications interface 70. The sensor controller SC transmits signals inputted from an array of vehicle condition detecting sensors into the vehicle surrounding-area monitoring controller 2, as-is or after evaluation. The array of vehicle condition detecting sensors connected to the sensor controller SC detects vehicle maneuvers and vehicle traveling conditions. The array of vehicle condition detecting sensors includes, although not shown, a steering sensor for measuring the steering direction (the direction of steerage) and the amount of control (the amount of steering), a shift position sensor for determining the shift position of the shift lever, an acceleration sensor for measuring the amount of operation of the accelerator pedal, a braking sensor for detecting the amount of operation of the braking pedal, and a distance sensor for detecting the traveling distance of the own vehicle.

The vehicle surrounding-area monitoring controller 2 is a computer system comprising a variety of functional units constituted by hardware, software, or a combination of both. The functional units of particular relevance to the present invention include an obstacle detecting module 30 for detecting obstacles around the vehicle, a image recognition module 40, an image processing module 50, the above-described communications interface 70, a display control unit 71, and an audio processing module 72. Images for monitor display created by the image processing module 50 are converted to video signals by the display control unit 71 and sent to the monitor 21. Voice guidance and emergency warning sounds created by the audio processing module 72 are sounded by a speaker 22.

Provided in the obstacle detecting module 30 is an obstacle detecting unit 31 for detecting obstacles by evaluating detection signals from a plurality of ultrasound sensors 3. The ultrasound sensors 3, disposed in both end portions and the center of each of the front, rear, left side, and right side of the vehicle, are capable of detecting objects (obstacles) present in the vicinity of the vehicle via the waves reflected from the objects. With its excellent ability to calculate the distances to or the locations of the obstacles, the obstacle detecting unit 31 is capable of estimating the distances from the vehicle to the objects and the sizes of the objects by processing the return times and amplitudes of the reflected waves at the respective ultrasound sensors 3. Furthermore, it is also possible to estimate the movements and the lateral external shapes of the objects by processing the results of detection performed by all the ultrasound sensors 3 over time. The obstacle detecting module 30 outputs obstacle information describing the locations, attitudes, and sizes of the recognized obstacles to the image recognition module 40. An alternative system may be applied, including one that employs a laser radar as the obstacle detecting unit 31.

The image recognition module 40 is provided with an obstacle recognition unit 41 for using video images of the original size from the onboard camera 1, i.e., wide view-field video image, to recognize obstacles. The obstacle recognition unit 41 has an object recognition algorithm, which itself is known, implemented therein for recognizing obstacles around the vehicle from inputted individual video images and chronologically sequential video images. For the purpose of determining the presence and location of an obstacle, one of the obstacle detecting unit 31 and the obstacle recognition unit 41 will suffice; however, more accurate obstacle recognition is possible through the cooperation between the obstacle recognition unit 41, capable of detecting the presence of an obstacle by using the video images originally created for display purposes, and the obstacle detecting unit 31, with its excellent ability to calculate the location of an object.

Figure 10:
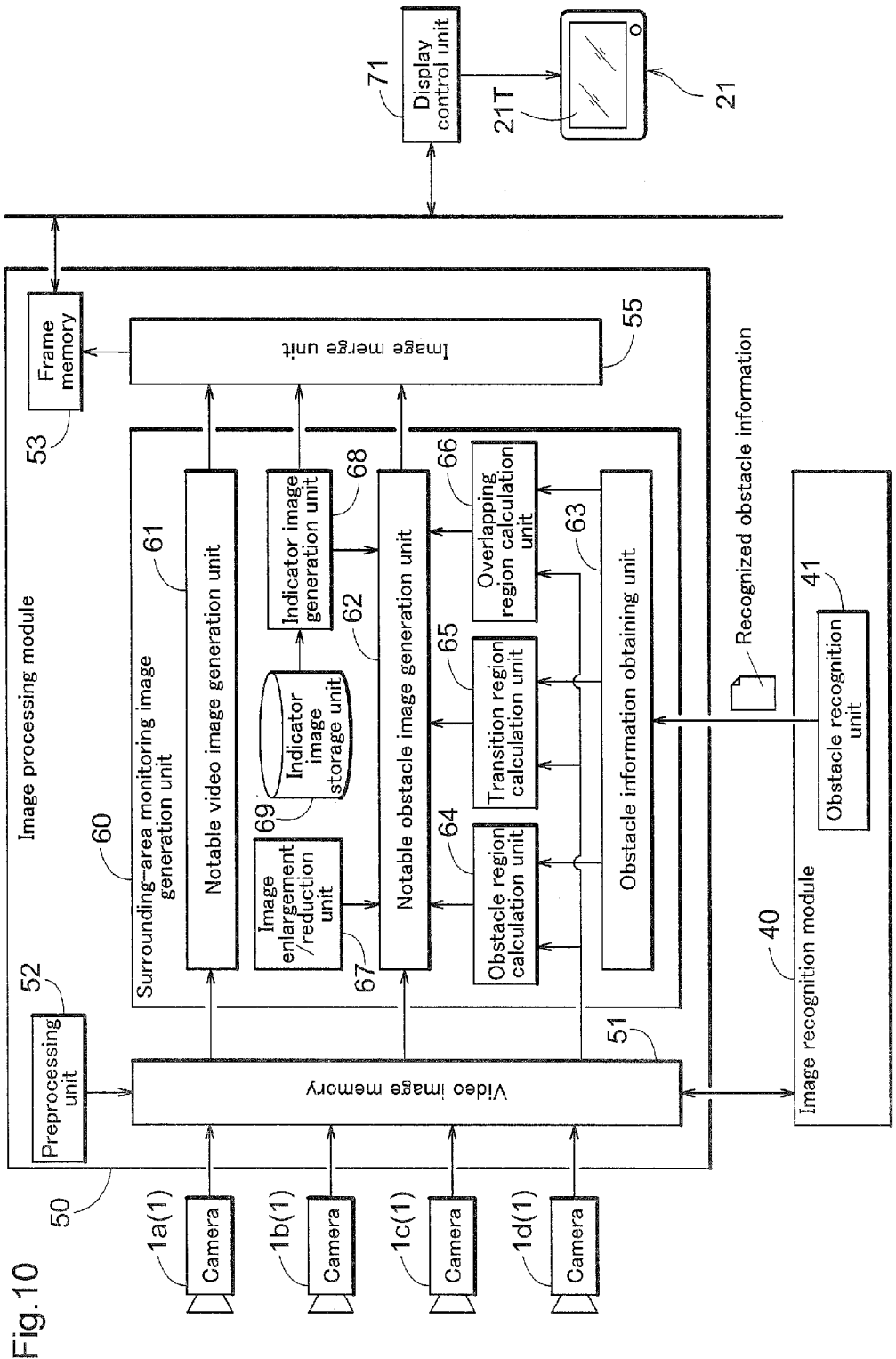
FIG. 10 is a functional block diagram of an image processing module according to the second embodiment of the present invention.

FIG. 10 shows a functional block diagram of the image processing module 50. The image processing module 50 is also a computer unit, thus capable of implementing various functions upon activation of programs. In the image processing module 50, programs and hardware implement the various functions necessary to process wide view-field video images sent from the camera 1 and deployed in the memory for outputting surrounding-area monitoring images. During that process, obstacle information sent from one or both of the image recognition module 40 and the obstacle detecting module 30 are referenced to incorporate an obstacle image into the surrounding-area monitoring image in a manner that facilitates object recognition. The functional units of particular relevance to the present invention includes, as shown in FIG. 10, a video image memory 51, a preprocessing unit 52, a surrounding-area monitoring image generation unit 60, and a frame memory 53. Video images obtained by the camera 1 are deployed in the video image memory 51, such that the preprocessing unit 52 may adjust the brightness and color balances, etc., between video images individually obtained by the camera 1.

The surrounding-area monitoring image generation unit 60 includes a notable video image generation unit 61, a notable obstacle image generation unit 62, an obstacle information obtaining unit 63, an obstacle region calculation unit 64, a transition region calculation unit 65, an overlapping region calculation unit 66, an image enlargement/reduction unit 67, an indicator image generation unit 68, and an indicator image storage unit 69. The notable video image generation unit 61 cuts out a center region set in advance in the wide view-field video image (the narrow view-field region) deployed in the video image memory 51 as a notable video image (a narrow view-field video image) and sends it to an image merge unit 55.

When an obstacle is recognized outside of the above-described narrow view-field region in the video image deployed in the video image memory 51, the notable obstacle image generation unit 62 generates a notable obstacle image containing the obstacle image. The notable obstacle image of this embodiment is comprised of an obstacle region in the video image calculated by the obstacle region calculation unit 64, a transition region in the video image calculated by the transition region calculation unit 65, and an overlapping region in the video image calculated by the overlapping region calculation unit 66. The obstacle region calculation unit 64 computes a rectangular region containing a recognized obstacle as the obstacle region based on obstacle information including the location of the obstacle in the video image sent from the obstacle recognition unit 41.

The transition region calculation unit 65 calculates, as the transition region, the region defined by the locus of the movement of the obstacle region outside the narrow view-field region toward the center of the vehicle. The overlapping region calculation unit 66 calculates a region extended from the transition region into the narrow view-field region as the overlapping region. It is advantageous to set the overlapping field in advance. Preferably, its width is one-third to one-fifth of the width of the notable obstacle image, but is not so limited. Since the obstacle region, the transition region, and the overlapping regions are connected, the notable obstacle image is continuous from a specific peripheral region of the notable video image.

The indicator image generation unit 68 outputs an indicator image that indicates the area surrounding the vehicle shown by the notable obstacle image, especially, the relative position of the region where the recognized obstacle is present with respect to the vehicle. The indicator image storage unit 69 stores a set of indicator images that indicate various relative positions of the regions where such obstacles are present with respect to the vehicle. Therefore, the indicator image generation unit 68 extracts from the indicator image storage unit 69 and outputs an appropriate indicator image based on the notable obstacle image obtained from the notable obstacle image generation unit 62, especially information about the location of the obstacle image. Further, if the indicator image is an image such as a grid pattern that divides the area surrounding the vehicle into blocks, the blocks based on the information about the location of the notable obstacle image may be emphasized for visibility, for example, by filling in these blocks, thus generating an indicator image properly indicating the relative position of the notable obstacle image with respect to the vehicle.

The indicator image outputted by the indicator image generation unit 68 and the notable obstacle image outputted by the notable obstacle image generation unit 62 are merged with the notable video image by the image merge unit 55. In this embodiment, as shown in FIG. 10, the image merge unit 55 displays on the monitor 21 the notable obstacle image in the upper portion of the notable video image on the side of the notable video image closer to the obstacle and displays the indicator image in the upper middle portion of the notable video image. Additionally, an image region symmetrically located with the notable obstacle image about the vehicle may be displayed, as a notable obstacle image in which no obstacle is present, on the opposite side to the notable obstacle image across the indicator image. In this way, once an obstacle is recognized, a notable obstacle image(s) and an indicator image are generated and outputted for display on the notable video image. As the notable obstacle image and the indicator image are displayed as pop-ups on the display screen of the notable video image, this mode of display draws the driver's attention more easily.

If the mode of display is such that the notable obstacle image is displayed as a pop-up on the notable video image, the notable obstacle image may almost completely hide the notable video image depending on the displayed area of the notable obstacle image. Therefore, if the displayed area of the notable obstacle image is a predetermined size or more, the image is preferably reduced. If the notable obstacle image has too small an area for recognition of the obstacle, the image is certainly to be enlarged. Additionally, if the transition region is too long, the transition region may advantageously be compressed (reduced in size). Such enlargement/size reduction of notable obstacle images and compression of transition regions are performed by the image enlargement/reduction unit 67.

Figure 11:
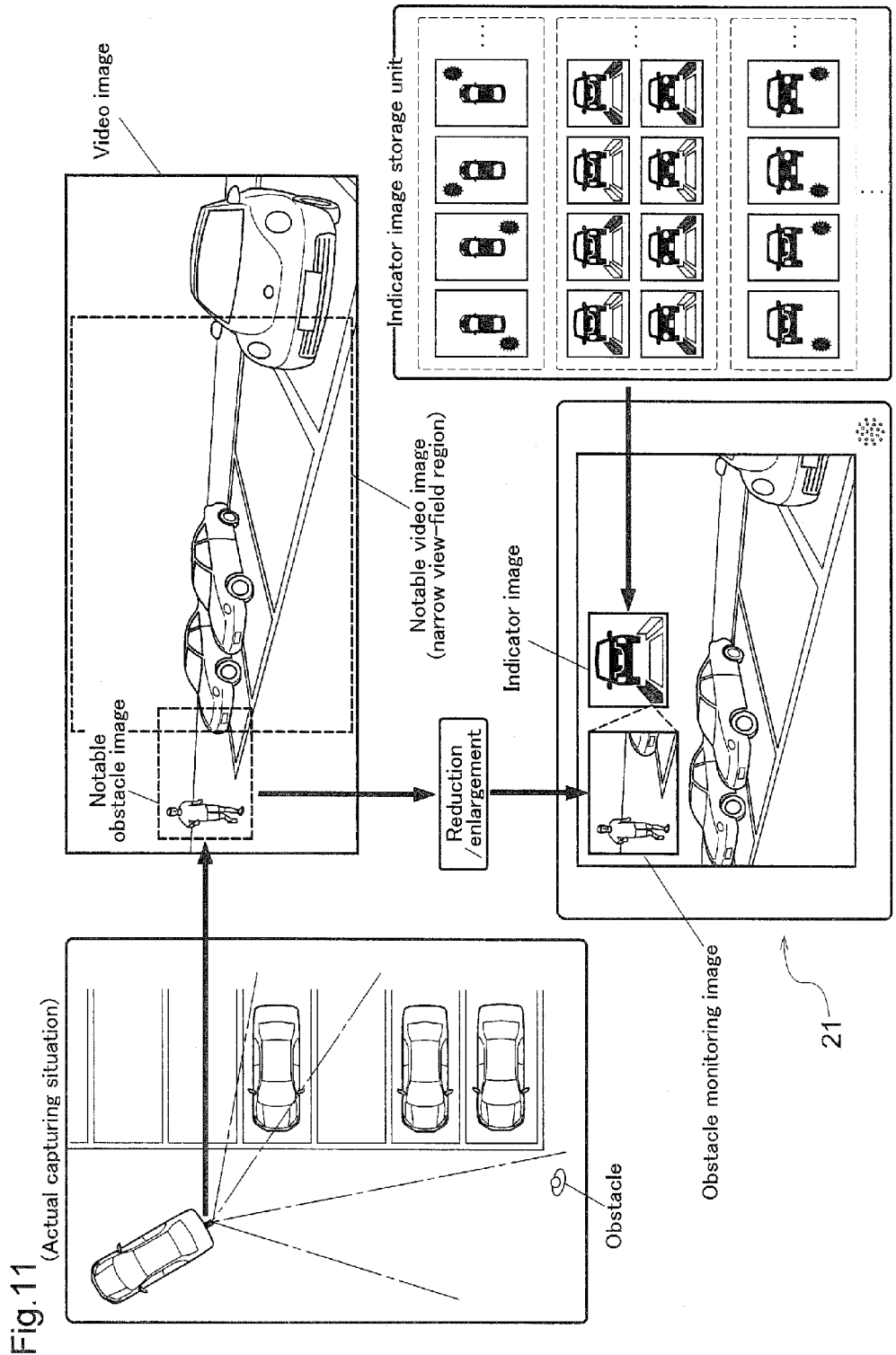
FIG. 11 is a schematic diagram illustrating the rear monitoring routine according to the second embodiment of the present invention.

For example, as shown in FIG. 11, the indicator image includes a rear view of the vehicle rendered thereon in the upper middle portion of the notable video image (an icon will also suffice) on the monitor while also indicating the direction in which the obstacle is located relative to the vehicle. Accordingly, the driver can intuitively understand which direction of the surrounding area with respect to the vehicle is shown by the notable obstacle image, which is displayed simultaneously as a pop-up.

One example of the rear monitoring routine that represents the control operation for rear safety check in the vehicle surrounding-area monitoring apparatus constructed as above is described with reference to the schematic diagram of FIG. 11 and the flowchart of FIG. 12.

First, upon start of the rear monitoring routine, camera 1 obtains video images (wide view-field images) (#01). The obtained video images are sequentially deployed in the memory to temporarily store images of a predetermined duration (#02). The video images deployed in the memory are subjected to correction of distortion, resolution conversion, level adjustments and other necessary image processing. These stored video images are also used by the simultaneously executing obstacle recognition routine. As recognition algorithms for recognizing objects having relative movements (they become obstacles if located near vehicle traveling paths) from video images obtained in a chronological sequence are well known, their description herein is omitted.

The notable video image generation unit 61 cuts out an image as a notable video image using a predetermined frame for cutting out a narrow view-field region (#03). Next, it is checked whether obstacle information has been outputted by the obstacle recognition unit 41 (#04). If obstacle information has been outputted, the obstacle region calculation unit 64 reads the coordinate position of the obstacle on the video image from the obstacle information and calculates the obstacle region (#05). It is then checked whether or not the obstacle region identified on the video image is contained in the narrow view-field region, in other words, whether or not the recognized obstacle is visible in the notable video image displayed on the monitor (#06). At this point, it is advantageous to regard the obstacle region identified on the video image as not being contained in the narrow view-field region if a part or the entirety of the obstacle region is located outside of the narrow view-field region. If it is determined by this checking that the obstacle region is not contained in the narrow view-field image region (the No branch at #06), the transition region calculation unit 65 then calculates the transition region in the video image (#07) and the overlapping region calculation unit 66 calculates the overlapping region (#08). Subsequently, a notable obstacle image is cut out from the video image based on the calculated obstacle region, transition region, and overlapping region (#09). The display area of the notable obstacle image is checked (#10) and only if enlargement/reduction is required, the notable obstacle image is subjected to enlargement/reduction, including compression of the transition region (#11). Concurrently with the generation of the notable obstacle image, the indicator image generation unit 68 generates an indicator image that indicates the relative position of the area surrounding the vehicle shown by the notable obstacle image with respect to the vehicle (#12). Next, the image merge unit 55 merges the notable video image, the indicator image, and the notable obstacle image to create a surrounding-area monitoring image, which is then outputted (#13). It should be noted that at this point, if a notable obstacle image (a dummy notable obstacle image symmetrical with the notable obstacle image about the vehicle center) may be created on the side where no obstacle is present, the driver may see that an obstacle is present in one direction while there is no obstacle in the other.

If the checking at the foregoing step #04 indicates that no obstacle information is outputted (the No branch at #04), the notable video image (the narrow view-field image) circumvents the image merger unit 55 and is outputted as the surrounding-area monitoring image (#14). The surrounding-area monitoring image outputted by the image merge unit 55 is sent to the display control unit 71 to display on the monitor 21 a screen view corresponding to that image (#15).

As can be understood from the above-described routine, if an obstacle is recognized with only a notable video image currently displayed as the surrounding-area monitoring image on the monitor 21, a surrounding-area monitoring image comprised of a notable obstacle image, an indicator image, and a notable video image is then displayed on the monitor 21, which makes it appear as if the notable obstacle image and the indicator image have just popped up on the display.

It is checked if a command has been issued for termination of the rear monitoring routine (#16) and as long as the rear monitoring continues (the No branch at #16), the process returns to #04 to repeat the foregoing process using the latest video images.

Alternative Embodiments (1) In the above-described first embodiment, an obstacle region is first calculated and a notable obstacle image is then generated for subsequent display on the monitor based on the obstacle region. As an alternative embodiment to this, modifications may be made such that the location of a notable obstacle image and the region in the video image that is to be the notable obstacle image are established in advance (i.e., established in advance to overlap with the narrow view-filed video image as shown in FIG. 6) and that notable obstacle image is displayed as a pop-up when an obstacle is detected in that region. After the notable obstacle image is displayed as a pop-up, if no obstacle is detected within the notable obstacle image any longer, the pop-up display of the notable obstacle image is terminated.

(2) Positions for a notable video image corresponding to the surrounding area in the vehicle traveling direction and notable obstacle images corresponding to the right and left surrounding areas of the vehicle may be allocated on the surrounding-area monitoring image such that, even under normal conditions, not only a notable video image but also notable obstacle images in which no obstacles are present may be merged with it for display. In this case, it is advantageous to emphasize a notable obstacle image containing a recognized obstacle, once the obstacle is recognized, in a manner that makes the notable obstacle image conspicuous, such as changing the color of the outer frame of the notable obstacle image (the pop-up display) or enclosing the image with a flashing frame.

(3) In the description of the foregoing embodiments, since the rear camera 1b for capturing the scenery rear of the vehicle is used as the imaging unit 1, the surrounding-area monitoring image displayed on the monitor 21 is for safety checking of the area behind the car. However, the present invention may be certainly applied to the monitoring of any area around a selected vehicle by employing the side cameras 1c, 1d for capturing the views on both sides of the vehicle or a front camera 1a for capturing the view forward of the vehicle as the imaging unit 1. Furthermore, down-captured conversion of viewpoint may be performed on a video image covering the entire area surrounding the vehicle generated by the imaging unit 1 so as to produce a bird's eye image as a notable video image to be merged with notable obstacle images.

(4) As a mode of displaying a notable obstacle image in conjunction with the notable video image, the notable obstacle image and the notable video image may be arranged side by side or displayed alternately at predetermined intervals, rather than the overlapping of the notable obstacle image on the notable video image as described above. Moreover, a display mode may be employed whereby alpha blend (translucent merge) is performed on the notable video image and the notable obstacle image to be able to observe both images.

(5) In the description of the foregoing embodiments, instead of displaying on the monitor all the obstacles recognized outside of the narrow view-field image as notable obstacle images, if the obstacle recognition unit 41 can recognize the directions of the movement of the obstacles, for example, the directions in which the obstacles are approaching the vehicle, notable obstacle images may be generated only for the obstacles recognized as approaching the own vehicle for display on the monitor.

(6) In the description of the foregoing second embodiment, a notable obstacle image includes an obstacle region, a transition region, and an overlapping region. However, if at least the obstacle region is included, the transition region, an overlapping region, or both of these regions may be omitted. In addition, to emphasize recognized obstacles, the obstacles may be enclosed in a polygonal, such as rectangular, or circular (including elliptic) lines or flashing lines, or the outlines of the obstacles may be enclosed with any of such lines.

Figure 12:
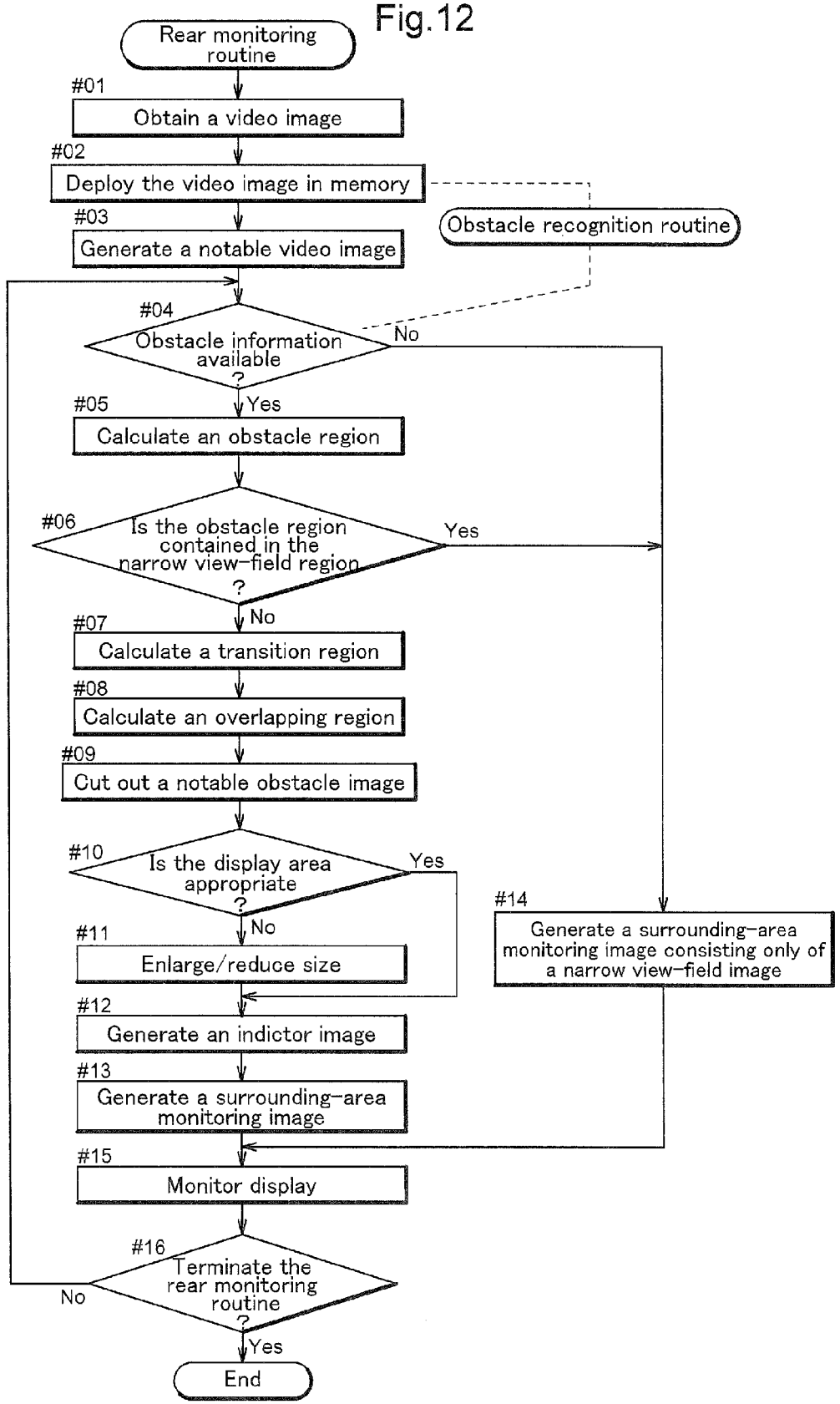
FIG. 12 is a flowchart representing one example of the rear monitoring routine performed by the vehicle surrounding-area monitoring apparatus according to the second embodiment of the present invention.

(7) FIG. 12 illustrates that, under normal conditions, i.e., when no obstacle is recognized outside of the narrow view-field region, only the narrow view-field region of the video image is displayed as the notable video image and when an obstacle is recognized outside of the narrow view-field region, an indicator image, comprised of the own vehicle and an indicator showing the relative position of the obstacle with respect to the vehicle, is displayed as a pop-up together with a notable obstacle image. Instead, as shown in FIG. 13, a precursory own-vehicle image to an indicator image may be added to the notable video image shown under normal conditions and when an obstacle is recognized outside of the narrow view-field region, a notable obstacle image may be displayed as a pop-up as well as an indicator image in the place of the aforementioned own vehicle image. In FIG. 13, the own-vehicle image shown under normal conditions includes a plurality of indicator frames as well as a representation (such as an illustration) of the own vehicle. More particularly, these are three indicator frames for the area directly in the rear of the vehicle, the area in the left rear of the vehicle, and the area in the right rear of the vehicle. When an obstacle is recognized outside of the narrow view-field region (within the notable obstacle image), etc., the one of the plurality of indicator frames that indicates the relative position of the obstacle with respect to the vehicle is filled in with an attention-drawing color (such as red or yellow, which is easily distinguishable from the background and draws people's attention) (certainly, a notable obstacle image is also displayed as a pop-up in addition to the filling in of the indicator frame). In other words, upon detecting an obstacle in the area surrounding the vehicle that corresponds to any of the three indicator frames, those for the area directly in the rear of the vehicle, the area in the left rear of the vehicle, and the area in the right rear of the vehicle, the corresponding indicator frame is filled in. At this stage, if obstacles are found in more than one area surrounding the vehicle (the area directly in the rear of the vehicle, the area in the left rear of the vehicle, and the area in the right rear of the vehicle), the corresponding indicator frames are filled in.

Additionally, the vehicle surrounding-area monitoring apparatus of the second embodiment may be as described hereafter.

In the vehicle surrounding-area monitoring apparatus, the indicator image is displayed in an upper middle portion of the notable video image with the notable obstacle image displayed to one side of the indicator image.

Furthermore, in the vehicle surrounding-area monitoring apparatus, the area surrounding the vehicle is the area in the rear of the vehicle and the notable video image is laterally inverted from an image captured by the imaging unit.

Additionally, in the vehicle surrounding-area monitoring apparatus, the notable obstacle image and the indicator image are displayed as pop-ups within the notable video image.

Further, in the vehicle surrounding-area monitoring apparatus, the notable obstacle image is comprised of an image in the obstacle region, an image in a transition region transitioning from the obstacle region to the narrow view-field region, and an image in an overlapping region extending into the narrow view-field region from the transition region.

Additionally, in the vehicle surrounding-area monitoring apparatus, the notable obstacle image is enlarged/reduced according to the distance between the obstacle region and the narrow view-field region.

INDUSTRIAL APPLICABILITY

The present invention can be applied to a parking assist apparatus for displaying video images obtained by an onboard camera for capturing the area surrounding the vehicle on the monitor along with obstacles recognized in the area surrounding the vehicle.

DESCRIPTION OF REFERENCE SIGNS

1: Imaging unit (camera)
2: Surrounding-area monitoring controller
21: Monitor
30: Obstacle detecting module
41: Obstacle recognition unit
50: Image processing module
55: Imaging merge unit
60: Surrounding-area monitoring image generation unit
61: Notable video image generation unit
62: Notable obstacle image generation unit
63: Obstacle information obtaining unit
64: Obstacle region calculation unit
65: Transition region calculation unit
66: Overlapping region calculation unit 67: Image enlargement/reduction unit
68: Indicator image generation unit
69: Indicator image storage unit
71: Display control unit

The invention claimed is:

1. A vehicle surrounding-area monitoring apparatus comprising:
   a notable video image generator generating a narrow view-field region as a notable video image, the narrow view-field region being part of a video image of an area surrounding a vehicle obtained by an imaging unit;
   an obstacle recognizer recognizing an obstacle in the area surrounding the vehicle;
   an obstacle region calculator calculating an obstacle region, the obstacle region being a region, in the video image, of the obstacle recognized by the obstacle recognizer;
   an overlapping region calculator calculating an overlapping region, the overlapping region being a region, in the video image, extending into the narrow view-field region from a direction of the obstacle region;
   a notable obstacle image generator generating a notable obstacle image comprising the obstacle region and the overlapping region, if the obstacle region is contained in an image region that is partially overlapping with the narrow view-field region and is a part of the video image; and
   an image merger generating a surrounding-area monitoring display image comprising the notable video image and the notable obstacle image.

2. A vehicle surrounding-area monitoring apparatus according to claim 1, wherein a right and left pair of placement regions for placing the notable obstacle images are set in the surrounding-area monitoring display image so as to be symmetrical with respect to the notable video image such that the notable obstacle images are generated as notable obstacle images placed in the placement regions.

3. A vehicle surrounding-area monitoring apparatus according to claim 2, wherein an indicator is placed in an upper middle portion of the notable video image, the indicator indicating the direction in which the obstacle is located with respect to the vehicle.

4. A vehicle surrounding-area monitoring apparatus according to claim 1, wherein when no obstacle is recognized, the notable video image is displayed as the surrounding-area monitoring display image, and when an obstacle is recognized, the notable obstacle image is displayed as a pop-up on the surrounding-area monitoring display image.

5. A vehicle surrounding-area monitoring apparatus according to claim 1, wherein a transition region that connects the obstacle region and the narrow view-field region is compressed along the direction of the transition according to the distance between the obstacle region and the narrow view-field region.

6. A vehicle surrounding-area monitoring apparatus according to claim 1, wherein the notable obstacle image generator generates a notable obstacle image containing at least the obstacle region from the video image if the obstacle region is located outside of the narrow view-field image, and
   wherein the image merger merges the notable video image, the notable obstacle image, and an indicator image that indicates the relative position of the notable obstacle image with respect to the vehicle so as to display the notable obstacle image as a pop-up on a monitor screen.

7. A vehicle surrounding-area monitoring apparatus according to claim 6, wherein the indicator image is displayed in an upper middle portion of the notable video image and the notable obstacle image is displayed to one side of the indicator image.

8. A vehicle surrounding-area monitoring apparatus according to claim 6, wherein the area surrounding the vehicle is an area rearward of the vehicle and the notable video image is laterally inverted from an image captured by the imaging unit.

9. A vehicle surrounding-area monitoring apparatus according to claim 6, wherein the notable obstacle image and the indicator image are displayed as pop-ups within the notable video image.

10. A vehicle surrounding-area monitoring apparatus according to claim 6, wherein the notable obstacle image comprises an image in the obstacle region, an image in a transition region transitioning from the obstacle region to the narrow view-field region, and an image in the overlapping region extending into the narrow view-field region from the transition region.

11. A vehicle surrounding-area monitoring apparatus according to claim 1, wherein the notable obstacle image is enlarged or reduced according to the distance between the obstacle region and the narrow view-field region.

12. A vehicle surrounding-area monitoring apparatus according to claim 1, wherein the notable obstacle image generator generates a notable obstacle image which is a portion of the vehicle surrounding captured image, the notable obstacle image including the obstacle image region recognized outside the narrow view-field region, the overlapping region as a region overlapped with the narrow view-field region, and a transition region transitioning from the obstacle region to the overlapping region.

13. A vehicle surrounding-area monitoring apparatus comprising:
   a notable video image generator generating a narrow view-field region as a notable video image, the narrow view-field region being part of a video image of an area surrounding a vehicle obtained by an imaging unit;
   an obstacle recognizer recognizing an obstacle in the area surrounding the vehicle;
   an obstacle region calculator calculating an obstacle region, the obstacle region being a region, in the video image, of the obstacle recognized by the obstacle recognizer;
   a notable obstacle image generator generating a notable obstacle image containing at least the obstacle region from the video image if the obstacle region is located outside of the narrow view-field image;
   an indicator image generator generating an indicator image that indicates the relative position of the notable obstacle image with respect to the vehicle; and
   an image merger merging the notable obstacle image, the indicator image, and the notable video image so as to display the notable obstacle image as a pop-up on a monitor screen.

* * * * *